United States Patent
Chen et al.

(10) Patent No.: US 11,858,228 B1
(45) Date of Patent: Jan. 2, 2024

(54) MOLDING DEVICE AND MOLDING METHOD

(71) Applicant: KING STEEL MACHINERY CO., LTD., Taichung (TW)

(72) Inventors: Ching-Hao Chen, Taichung (TW); Liang-Hui Yeh, Taichung (TW)

(73) Assignee: KING STEEL MACHINERY CO., LTD., Taichung (TW)

( * ) Notice: Subject to any disclaimer, the term of this patent is extended or adjusted under 35 U.S.C. 154(b) by 0 days.

(21) Appl. No.: 17/731,764

(22) Filed: Apr. 28, 2022

(51) Int. Cl.
*B29D 35/00* (2010.01)
*B29D 35/02* (2010.01)
*B29C 33/30* (2006.01)

(52) U.S. Cl.
CPC ........ *B29D 35/0027* (2013.01); *B29C 33/304* (2013.01); *B29D 35/02* (2013.01)

(58) Field of Classification Search
CPC ........ B29C 33/304; B29C 2045/14131; B29C 2045/2657; B29C 2045/2648; B29C 45/363; B29C 2045/363; B29C 2045/445; B29C 45/36; B29C 41/38; B29C 33/76; B29C 2045/366; B29C 2045/1798; B29C 45/1743; B29C 2045/1785; B29C 45/6778; B29D 35/02; B29D 35/0036; B29D 35/0018; B29D 35/0027
See application file for complete search history.

(56) References Cited

U.S. PATENT DOCUMENTS

| | | | | |
|---|---|---|---|---|
| 2,068,239 A | * | 1/1937 | Maim | B29D 35/02 12/142 E |
| 3,255,493 A | * | 6/1966 | Tutt | B29C 45/28 425/119 |
| 3,284,558 A | * | 11/1966 | Ludwig | A43B 1/0027 425/577 |
| 3,371,385 A | * | 3/1968 | Mairle | B29C 45/2701 425/441 |
| 3,496,608 A | * | 2/1970 | Clarke | B29D 35/0027 425/188 |
| 3,813,201 A | * | 5/1974 | Frederick | B29D 35/0063 249/105 |
| RE29,041 E | * | 11/1976 | Fukuoka | A43B 3/102 36/11.5 |

(Continued)

FOREIGN PATENT DOCUMENTS

| | | |
|---|---|---|
| CN | 206926202 U | 1/2018 |
| CN | 110421795 A | 11/2019 |

(Continued)

OTHER PUBLICATIONS

Office Action, Cited References and Search Report dated Apr. 10, 2023 issued by the Taiwan Intellectual Property Office for the Taiwan Counterpart Application No. 111142662.

(Continued)

*Primary Examiner* — Emmanuel S Luk
(74) *Attorney, Agent, or Firm* — WPAT LAW; Anthony King

(57) ABSTRACT

A molding device and a molding method are disclosed. The molding device includes an upper mold, a lower mold and a middle mold. The lower mold is disposed below the upper mold. The middle mold is disposed between the upper mold and the lower mold. The middle mold is moveably attached to the lower mold through a position control mechanism.

20 Claims, 31 Drawing Sheets

(56) References Cited

U.S. PATENT DOCUMENTS

| | | | | |
|---|---|---|---|---|
| 4,743,420 | A * | 5/1988 | Dutt | B29C 45/0046 |
| | | | | 264/102 |
| 5,955,017 | A * | 9/1999 | Foffano | B29D 35/10 |
| | | | | 264/161 |
| 6,439,536 | B1 * | 8/2002 | Piccolo | B29D 35/0027 |
| | | | | 249/177 |
| 6,540,864 | B1 * | 4/2003 | Chi | B29D 35/142 |
| | | | | 264/319 |
| 2004/0021241 | A1 | 2/2004 | Liu | |
| 2004/0231191 | A1 * | 11/2004 | Seamans | A43B 3/0042 |
| | | | | 249/91 |
| 2005/0236740 | A1 * | 10/2005 | Niewels | B29C 45/561 |
| | | | | 264/328.7 |
| 2007/0278716 | A1 * | 12/2007 | Johnson | B29D 35/142 |
| | | | | 264/273 |
| 2010/0242312 | A1 * | 9/2010 | Lim | B29D 35/148 |
| | | | | 36/28 |
| 2017/0297240 | A1 * | 10/2017 | Hammerl | B29C 44/582 |
| 2018/0147763 | A1 * | 5/2018 | Sorimoto | B29C 45/401 |
| 2020/0282611 | A1 | 9/2020 | Hirasawa | |
| 2020/0406511 | A1 * | 12/2020 | Bordin | B29D 35/02 |
| 2022/0219365 | A1 * | 7/2022 | Sorimoto | B29C 33/444 |
| 2022/0305711 | A1 * | 9/2022 | Park | B29C 45/4435 |

FOREIGN PATENT DOCUMENTS

| | | |
|---|---|---|
| DE | 10038830 A1 | 12/2001 |
| EP | 1591227 A1 | 11/2005 |
| EP | 3216578 A1 | 9/2017 |
| JP | H06-064848 U | 9/1994 |
| JP | H08-25368 A | 1/1996 |
| JP | 2000094464 A | 4/2000 |
| JP | 2000-229323 A | 8/2000 |
| JP | 2002-172641 A | 6/2002 |
| JP | 2005-313385 A | 11/2005 |
| TW | M637787 U | 2/2023 |
| WO | 2012008832 A2 | 1/2012 |

OTHER PUBLICATIONS

Office Action, Cited References and Search Report dated May 9, 2023 issued by the Japan Patent Office for the Japan Counterpart Application No. 2022-122599.

Search Report, Cited References dated Sep. 21, 2023 issued by the European Patent Office for the EP Counterpart Application No. 22 20 6684.7.

* cited by examiner

MOLDING DEVICE AND MOLDING METHOD

TECHNICAL FIELD

The present invention is related to a molding device and a molding method thereof; in particular, to a molding device and a molding method thereof suitable for use in injection molding or extrusion molding.

BACKGROUND

Foamed polymer articles have many advantages, such as high strength, light weight, impact resistance, good sound insulation and thermal insulation, etc. The foamed polymer article can be made into a molded article having a predetermined shape by injection molding or extrusion molding. For example, after the polymer material is melted and mixed with a blowing agent through an injection molding machine to form a mixture, the molten polymer is applied by applying pressure so that it is injected or extruded into the mold cavity of the mold to form the desired foamed polymer article. The properties and applications of foamed polymer articles can be altered by changing the composition of the mixture and adjusting the forming method.

In general, the appearance and physical properties of the foamed polymer articles are directly affected by the forming process, and hence, the design of the mold must consider the fluidity of the mixture so that the mixture can be distributed in the cavity uniformly and rapidly and distribution density of bubble pores in the mixture is high and uniform during the forming process so as to retain the original physical property. Although foamed polymer articles formed using the mold have many advantages and applications, their shortcomings are still the limitations and restrictions that have yet to be broken.

BRIEF SUMMARY OF THE INVENTION

One purpose of the present invention is to provide a molding device and a molding method.

According to one embodiment of the present disclosure, a molding device is disclosed. The molding device includes an upper mold, a lower mold and a middle mold. The lower mold is disposed below the upper mold. The middle mold is disposed between the upper mold and the lower mold. The middle mold is moveably attached to the lower mold through a position control mechanism.

According to one embodiment of the present disclosure, a molding method is disclosed. The molding method includes (a) providing a lower mold and a middle mold moveably attached to the lower mold; (b) engaging an upper mold with the lower mold to define an accommodating space and dispose the middle mold within the accommodating space, wherein the upper mold, the middle mold and the lower mold jointly define a mold cavity; (c) injecting a material into the mold cavity and at least partially surrounding the middle mold; and (d) forming an article from the material.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION

Figure 1A:
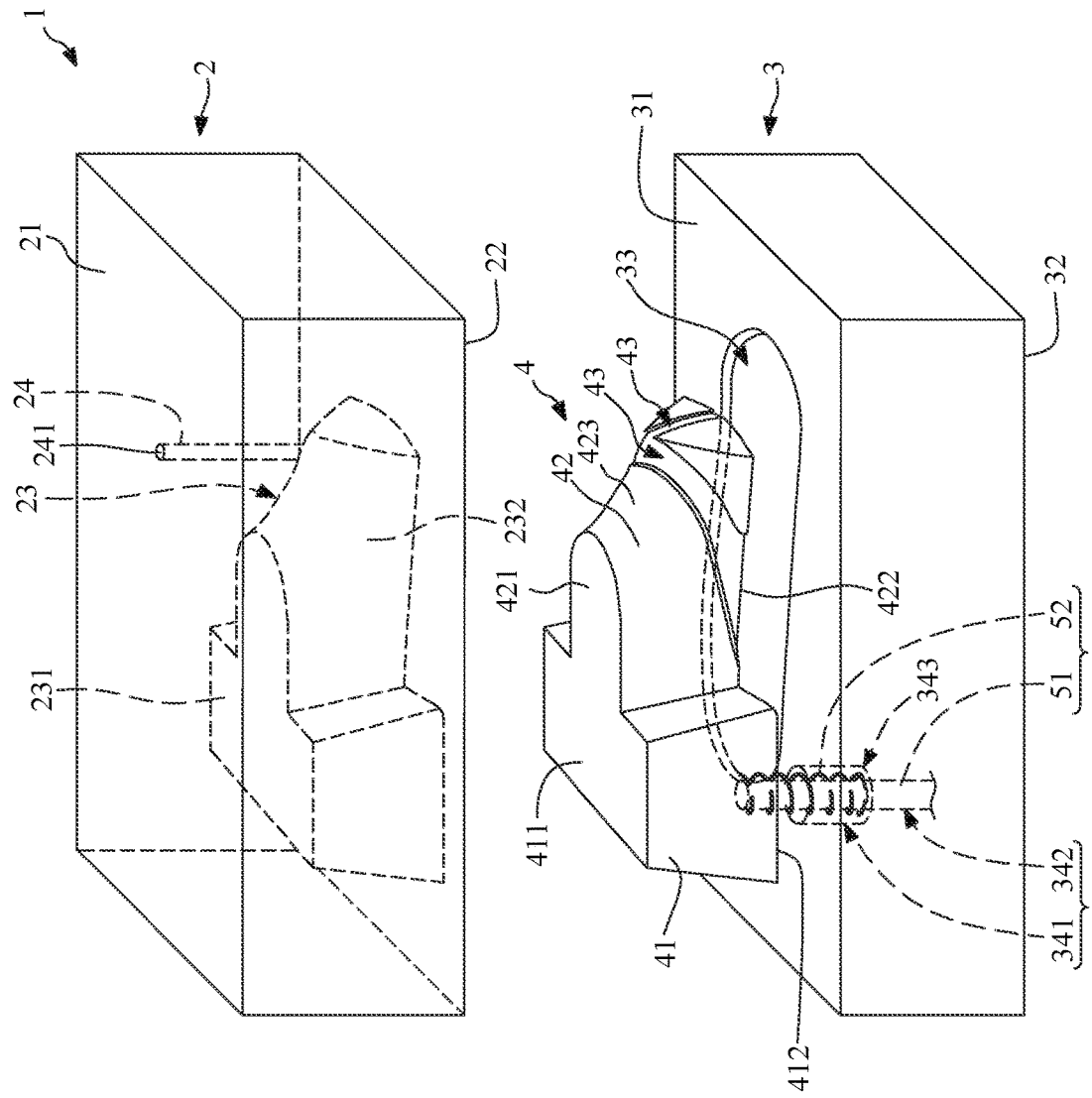
FIG. 1A is a schematic perspective view of a molding device at one or more manufacturing stages of a molding method according to some embodiments of the present invention.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the term "about." Accordingly, unless indicated to the contrary, the numerical parameters set forth in the present disclosure and attached claims are approximations that can vary as desired. At the very least, each numerical parameter should be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

FIG. 1A through FIG. 8 illustrate a molding method for manufacturing an article according to some embodiments of the present disclosure. In some embodiments, the method is for manufacturing the article 6 shown in FIG. 8.

Figure 1B:
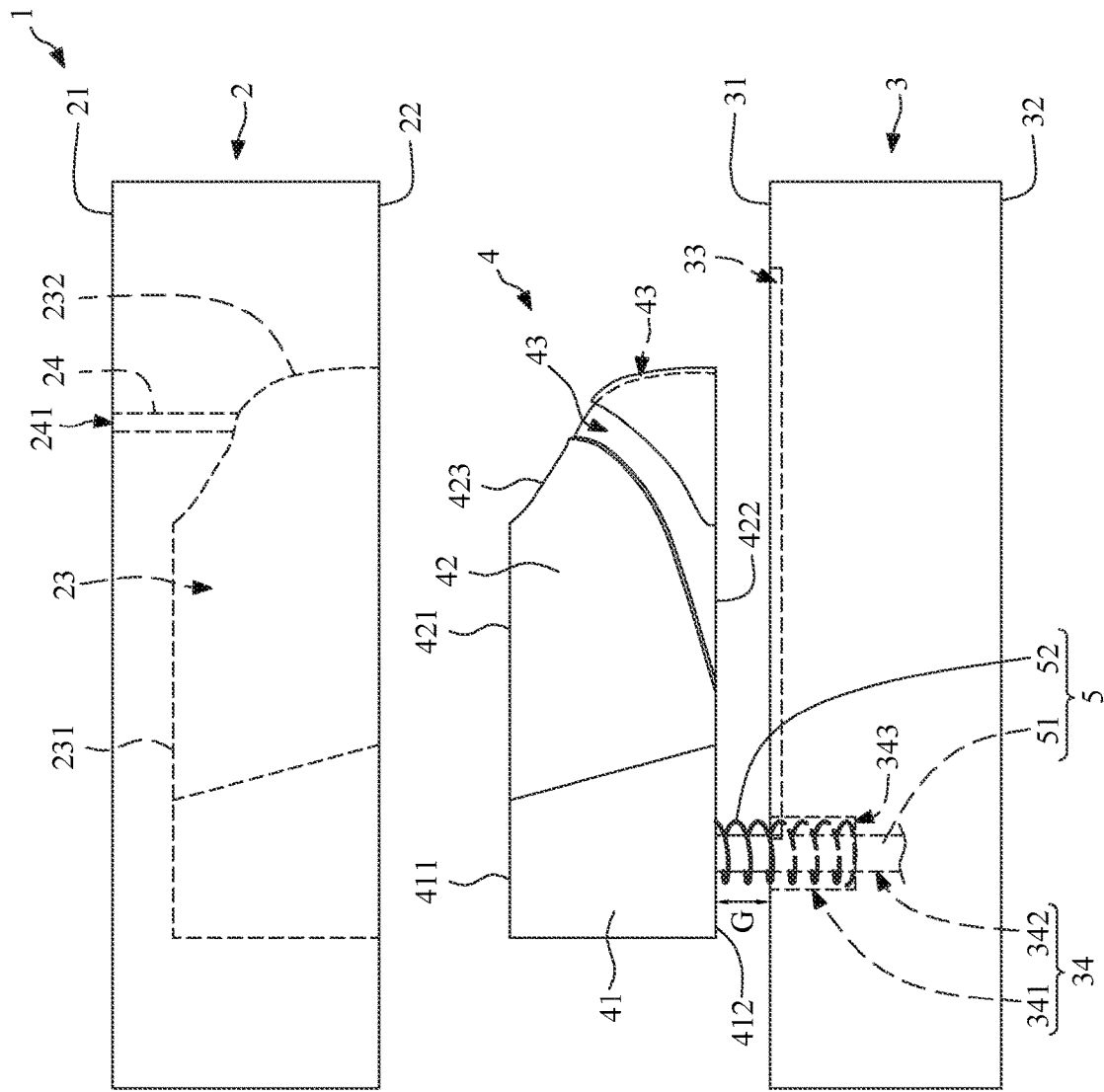
FIG. 1B is a side view of the molding device of FIG. 1A.

Referring to FIG. 1A and FIG. 1B, a molding device 1 is provided. FIG. 1A is a schematic perspective view of a molding device 1 at a first manufacturing stage according to some embodiments of the present invention. FIG. 1B is a side view of the molding device 1 of FIG. 1A. The molding device 1 may include an upper mold 2, a lower mold 3, a middle mold 4 and a position control mechanism 5.

In some embodiments, the upper mold 2 may correspond to the lower mold 3 in some configurations such as dimension, shape or the like. The upper mold 2 may be placed on and engaged with the lower mold 3. In some embodiments, the provision of the molding device 1 may include conveying the lower mold 3 towards the upper mold 2. As such, the lower mold 3 would be disposed under the upper mold 2 for subsequent steps. In some embodiments, the upper mold 2 may be aligned with the lower mold 3. In the embodiment illustrated in FIG. 1A and FIG. 1B, the molding device 1 is in an open configuration.

The upper mold 2 may have a top surface 21 and a bottom surface 22 opposite to the top surface 21. The upper mold 2 may define a recess portion 23 and a passage 24. The bottom surface 22 of the upper mold 2 may face the lower mold 3 and the middle mold 4. The recess portion 23 of the upper mold 2 may be recessed from the bottom surface 22 of the upper mold 2. A configuration (e.g., dimension or shape) of the recess portion 23 of the upper mold 2 may correspond to a configuration (e.g., dimension or shape) of the middle mold 4. The recess portion 23 of the upper mold 2 may include a first inner surface 231 and a second inner face 232. The second inner face 232 may extend between the first inner surface 231 and the bottom surface 22 of the upper mold 2. The first inner surface 231 and the second inner face 232 may be substantially conformal with the middle mold 4.

Figure 3A:
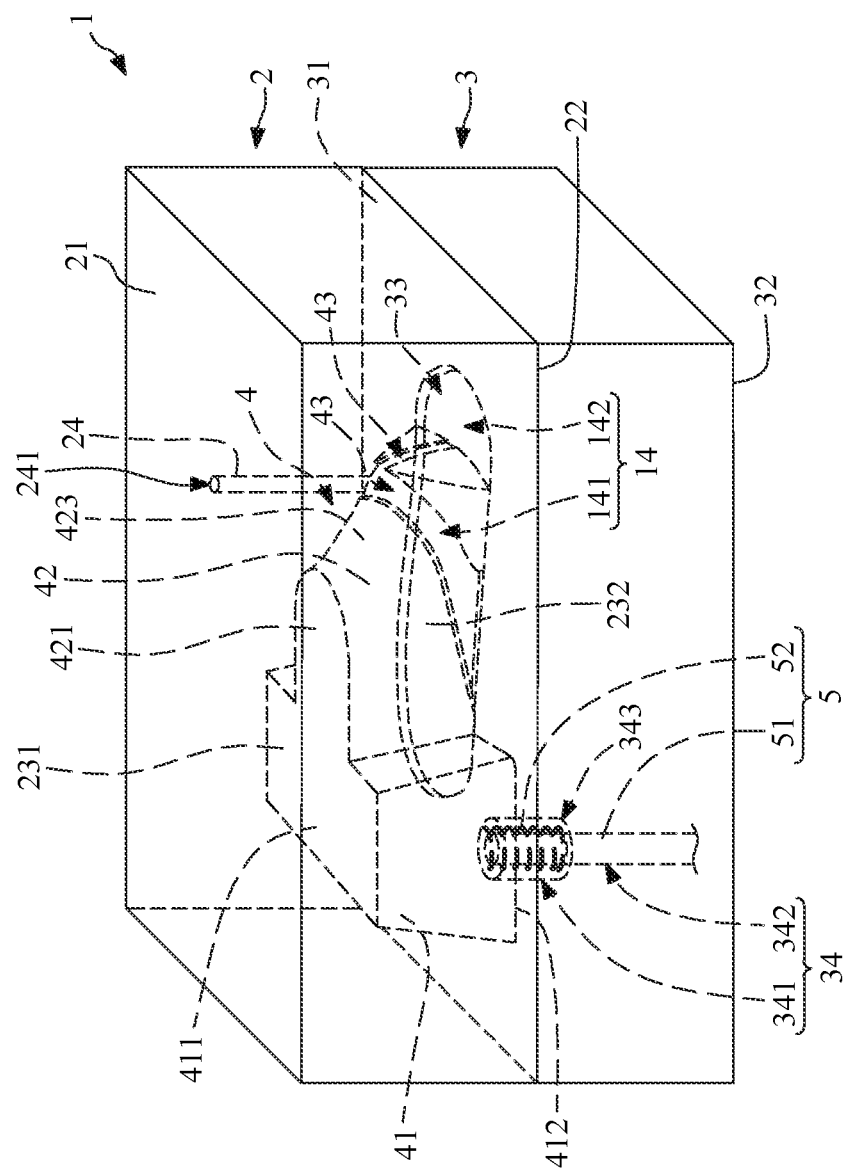
FIG. 3A is a schematic perspective view of a molding device at one or more manufacturing stages of a molding method according to some embodiments of the present invention.
Figure 3B:
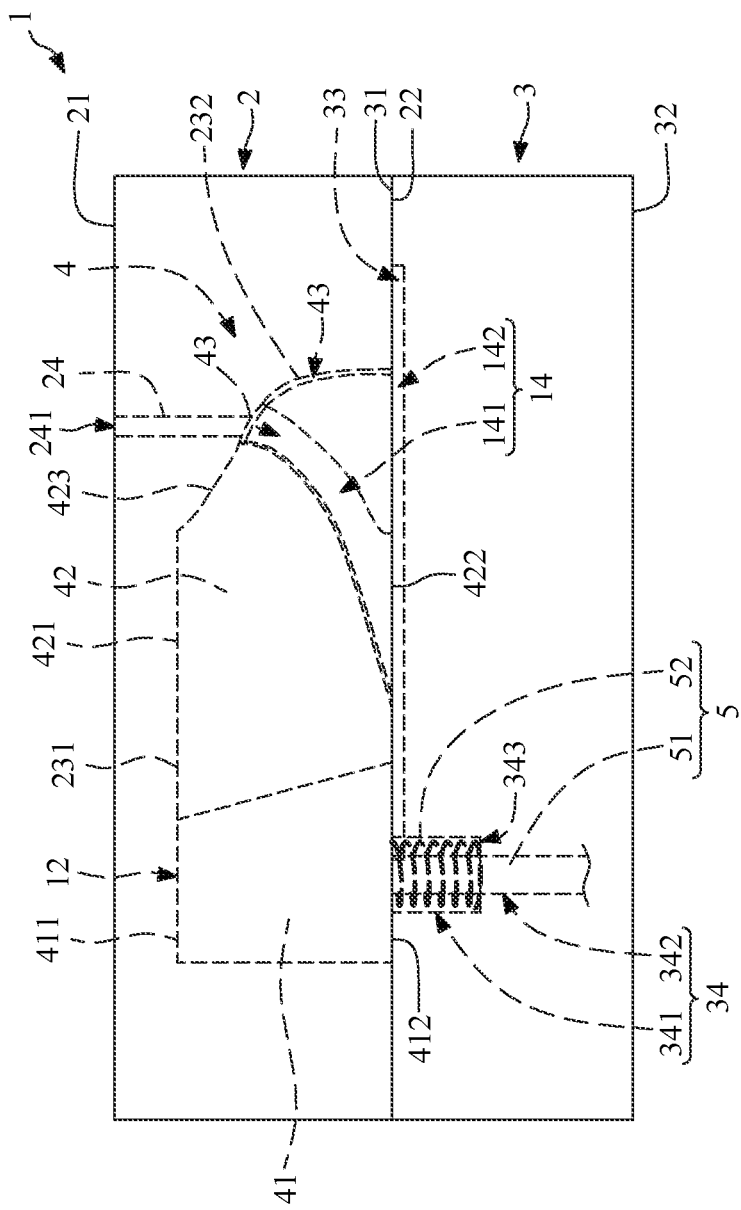
FIG. 3B is a side view of the molding device of FIG. 3A.

In some embodiments, the passage 24 may extend through the upper mold 2, and may have an opening 241 on the top surface 21 of the upper mold 2. In some embodiments, the passage 24 may be communicable with the recess portion 23 of the upper mold 2 or the mold cavity 14 when the molding device 1 is in the closed configuration as shown in FIG. 3A and FIG. 3B. Alternatively, the passage 24 may be in communication with the recess portion 23 of the upper mold 2. Thus, the recess portion 23 of the upper mold 2 may be accessible through the passage 24. For simplicity and clarity, only one passage 24 is illustrated, however, it can be understood that any suitable numbers of the passage 24 can be configured at the upper mold 2. In some embodiments, the number of the passage 24 is identical to the number of the recess portion 23 of the upper mold 2. In some embodiments, the number of the recess portion 23 of the upper mold 2 is more than the number of the passage 24. In some embodiments, the number of the passage 24 is more than the number of the recess portion 23 of the upper mold 2.

In some embodiments, instead of configuring the passage 24 at the upper mold 2, the passage 24 may be configured at the lower mold 3 for accessing a recess portion 3 of the lower mold 3 or the mold cavity 14 when the molding device 1 is in the closed configuration as shown in FIG. 3A and FIG. 3B. In some embodiments, the passage 24 may be configured at a sidewall of the lower mold 3, a bottom portion of the lower mold 3, or any other suitable positions as long as the passage 24 is communicable with the mold cavity 14 when the molding device 1 is in the closed configuration as shown in FIG. 3A and FIG. 3B.

The lower mold 3 may be disposed below the upper mold 2. The lower mold 3 may have a top surface 31 and a bottom surface 32 opposite to the top surface 31. The lower mold 3 may define a recess portion 33 and a hole structure 34. The top surface 31 of the lower mold 3 may face the upper mold 2 and the middle mold 4. The recess portion 33 of the lower mold 3 may be recessed from the top surface 31 of the lower mold 3. A configuration (e.g., dimension or shape) of the recess portion 33 of the lower mold 3 may correspond to a configuration (e.g., dimension or shape) of a bottom surface of the middle mold 4. A position of the recess portion 33 of the lower mold 3 may be right under the middle mold 4. The recess portion 33 of the lower mold 3 may be a portion of the mold cavity 14 when the molding device 1 is in the closed configuration as shown in FIG. 3A and FIG. 3B.

In some embodiments, the hole structure 34 may be disposed outside the recess portion 33 of the lower mold 3. Thus, the hole structure 34 may not be in communication with the recess portion 33 of the lower mold 3. Thus, recess portion 33 of the lower mold 3 may not be accessible through the hole structure 34. In some embodiments, the hole structure 34 may or may not extend through the lower mold 3. The hole structure 34 may include a first hole 341 and a second hole 342 in communication with each other. The first hole 341 may have an opening on the top surface 31 of the lower mold 3. The second hole 342 is under the first hole 341. A size (e.g., width or diameter) of the second hole 342 is smaller than a size (e.g., width or diameter) of the first hole 341, so as to form a step structure 343.

For simplicity and clarity, only one hole structure 34 is illustrated, however, it can be understood that any suitable numbers of the hole structure 34 can be configured at the lower mold 3. In some embodiments, the hole structure 34 may be used for accommodating at a portion of the position control mechanism 5. Thus, the number of the hole structure 34 may be equal to the number of the position control mechanism 5. In some embodiments, the number of the hole structure 34 may be two or three, which can balance or substantially uniformly support a downward press force applied on the position control mechanism 5 and the middle mold 4 from the upper mold 2.

The middle mold 4 may be disposed between the upper mold 2 and the lower mold 3, and may be moveably attached to the lower mold 3 through the position control mechanism 5. The middle mold 4 may be moveable between the upper mold 2 and the lower mold 3. In some embodiments, the middle mold 4 can move between the upper mold 2 and the lower mold 3 due to the operation of the position control mechanism 5. In some embodiments, the position control mechanism 5 can drive or actuate the middle mold 4 to move along a direction between the upper mold 2 and the lower mold 3, or along a height of the molding device 1. It can be understood that a maximum displacement of the middle mold 4 is limited by the position control mechanism 5. That is, the gap or distance between the middle mold 4 and the lower mold 3 is controlled by the position control mechanism 5. Further, the gap or distance between the middle mold 4 and the upper mold 2 is not controlled by the position control mechanism 5.

As shown in FIG. 1A and FIG. 1B, the middle mold 4 may include a main portion 41 and a shoe last 42. The main portion 41 may be connected to a back end of the shoe last 42. In some embodiments, the main portion 41 and the shoe last 42 may be formed integrally as a monolithic structure. The main portion 41 may have a top surface 411 and a bottom surface 412 opposite to the top surface 411. The shoe last 42 may have a top surface 421, a bottom surface 422 opposite to the top surface 421, and an outer surface 423 extending between the top surface 421 and the bottom surface 422. In addition, the shoe last 42 may define at least one recess 43 recessed from the outer surface 423. The recess 43 of the middle mold 4 may be a portion of the mold cavity 14 when the molding device 1 is in the closed configuration as shown in FIG. 3A and FIG. 3B. In some embodiments, the at least one recess 43 may include a plurality of recesses 43 in communication with each other and extending to the bottom surface 422 of the shoe last 42. In some embodiments, the shoe last 42 may further define at least one bottom recess (not shown) recessed from the bottom surface 422 of the shoe last 42.

The top surface 421 of the shoe last 42 may be substantially aligned with or coplanar with the top surface 411 of the main portion 41. Thus, a top surface of the middle mold 4 may include the top surface 421 of the shoe last 42 and the top surface 411 of the main portion 41. Further, the bottom surface 422 of the shoe last 42 may be substantially aligned with or coplanar with the bottom surface 412 of the main portion 41. Thus, a bottom surface of the middle mold 4 may include the bottom surface 422 of the shoe last 42 and the bottom surface 412 of the main portion 41. As a result, a maximum thickness of the shoe last 42 may be substantially equal to a maximum thickness of the main portion 41 and a maximum thickness of the middle mold 4.

The position control mechanism 5 may be connected or attached to the bottom surface 412 of the main portion 41 of the middle mold 4. The position control mechanism 5 may drive or actuate the middle mold 4 to move upward so as to generate a gap G between the top surface 31 of the lower mold 3 and a bottom surface of the middle mold 4 (including the bottom surface 422 of the shoe last 42 and the bottom surface 412 of the main portion 41) when the molding device 1 is in an open configuration. That is, the position control mechanism 5 may generate the relative movement between the middle mold 4 and the lower mold 3. As shown in FIG. 1A and FIG. 1B, the molding device 1 is in an open configuration, and the gap G reaches its maximum value.

In some embodiments, a portion of the position control mechanism 5 may be accommodated in the hole structure 34 of the lower mold 3. Thus, when the molding device 1 is in a closed configuration, the whole position control mechanism 5 may be accommodated in the hole structure 34 of the lower mold 3, and the bottom surface 412 of the main portion 41 may contact the top surface 31 of the lower mold 3.

As shown in FIG. 1A and FIG. 1B, the position control mechanism 5 may include at least one ejector 51 and an elastic mechanism 52. The ejector 51 may be a pin, a pillar, a post or a column, and may be used for guiding the moving direction of the middle mold 4. An upper end of the ejector 51 may be connected or attached to the bottom surface 412 of the main portion 41 of the middle mold 4, and a lower end of the ejector 51 may extend through the first hole 341 of the hole structure 34 and extend into the second hole 342 of the hole structure 34. The elastic mechanism 52 may be used for controlling a movement of the ejector 51 or driving the ejector 51. For example, the elastic mechanism 52 may be a spring or an elastic body that surrounds the ejector 51. An upper end of the elastic mechanism 52 may be connected or attached to the bottom surface 412 of the main portion 41 of the middle mold 4, and a lower end of the elastic mechanism 52 may be connected or attached to the step structure 343 of the hole structure 34 of the lower mold 3. When a downward force is applied on the middle mold 4 to drive the middle mold 4 to move downward to press the elastic mechanism 52, an elastic potential energy is stored in the pressed elastic mechanism 52. Once the downward force is released, the elastic potential energy will push the middle mold 4 to move upward. It can be understood that the position control mechanism 5 may be a piston or other suitable mechanism that has a compression phase and a springback phase. In some embodiments, the elastic mechanism 52 may be omitted, and the lower end of the ejector 51 may be connected to a suitable actuator. Thus, the movement of the ejector 51 may not controlled by the elastic potential energy.

In some embodiments, the middle mold 4 may be detachable from the lower mold 3 and the position control mechanism 5. It can be understood that the size or appearance of the article 6 (FIG. 8) may correspond to the size or appearance of the middle mold 4. Thus, in order to manufacture different articles 6 (FIG. 8) having different sizes or different appearances, different middle mold 4 having different sizes or different appearances may be adopted and changed. When the middle mold 4 is changed, the recess portion 33 of the lower mold 3 and the recess portion 23 of the upper mold 2 may be changed accordingly.

Figure 2A:
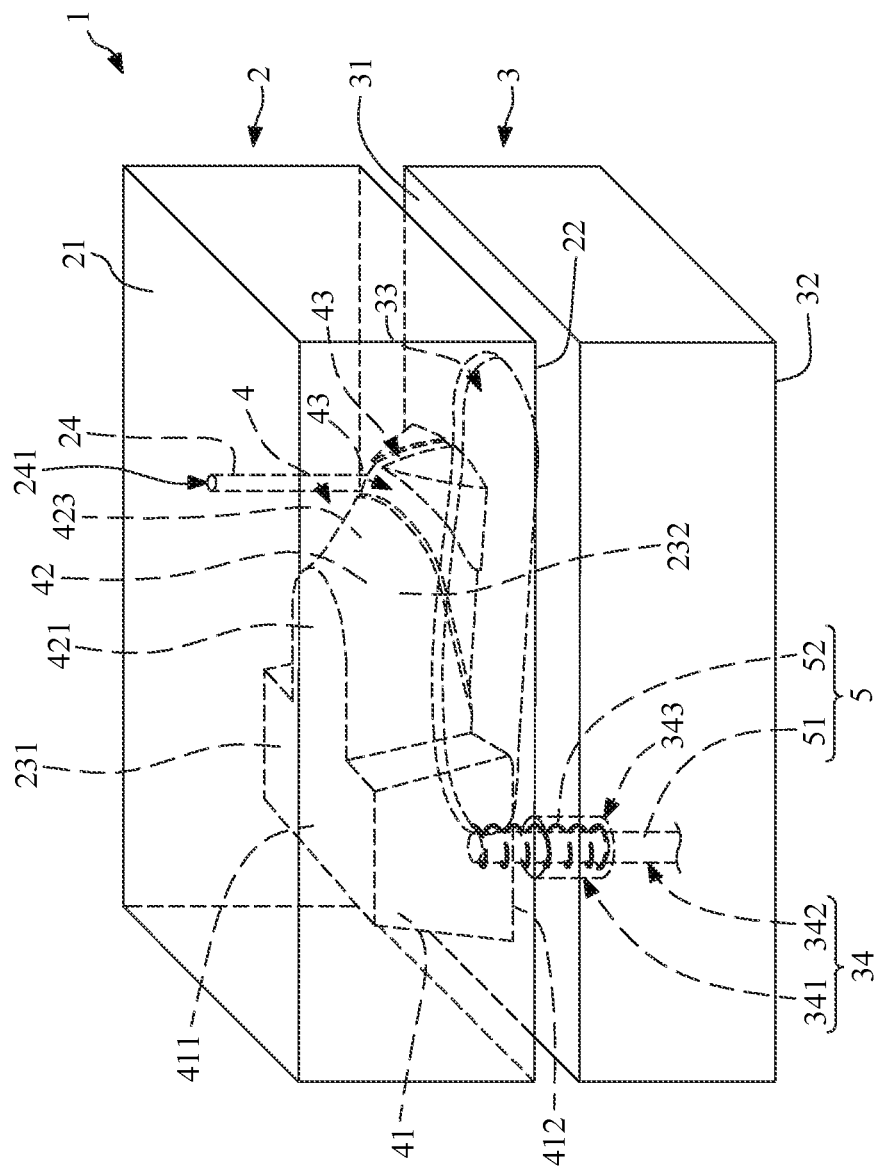
FIG. 2A is a schematic perspective view of a molding device at one or more manufacturing stages of a molding method according to some embodiments of the present invention.
Figure 2B:
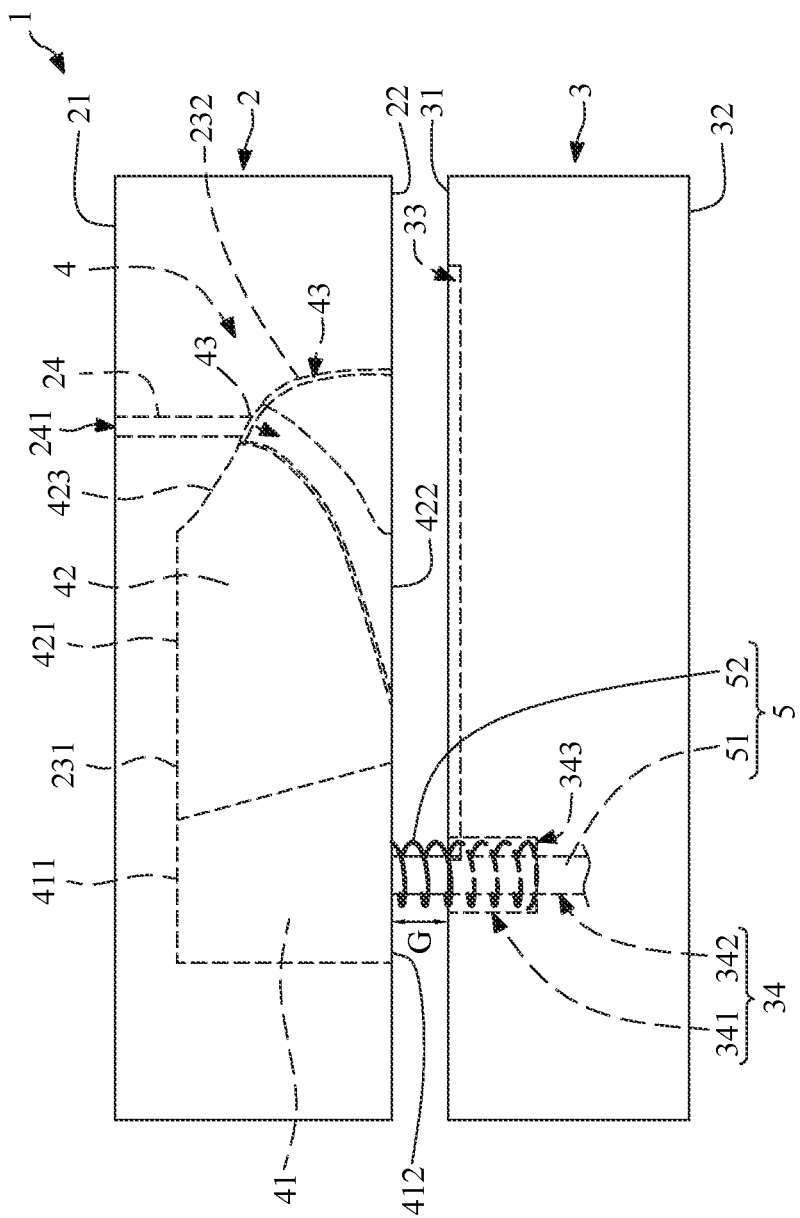
FIG. 2B is a side view of the molding device of FIG. 2A.

Referring to FIG. 2A and FIG. 2B, a distance between the upper mold 2 and the lower mold 3 is reduced gradually. FIG. 2A is a schematic perspective view of the molding device 1 at a second manufacturing stage according to some embodiments of the present invention. FIG. 2B is a side view of the molding device 1 of FIG. 2A. As shown in FIG. 2A and FIG. 2B, a relative movement between the upper mold 2 and the lower mold 3 occurs. In some embodiments, the position of the upper mold 2 may be fixed, and the lower mold 3 and the middle mold 4 may move together toward the upper mold 2. In some embodiments, the positions of the lower mold 3 and the middle mold 4 may be fixed, and the upper mold 2 may move toward the lower mold 3 and the middle mold 4. In some embodiments, the lower mold 3 and the upper mold 2 may move toward each other. At the stage illustrated in FIG. 2A and FIG. 2B, the middle mold 4 has contacted the upper mold 2, but the lower mold 3 has not contacted the upper mold 2 yet. That is, the middle mold 4 contacts the upper mold 2 before the lower mold 3 contacts the upper mold 2. For example, the middle mold 4 may be accommodated in the recess portion 23 of the upper mold 2. The first inner surface 231 of the upper mold 2 may contact the top surface of the middle mold 4 (including the top surface 421 of the shoe last 42 and the top surface 411 of the main portion 41). The second inner face 232 of the upper mold 2 may contact the outer surface 423 of the middle mold 4. In some embodiments, the bottom surface of the middle mold 4 (including the bottom surface 422 of the shoe last 42 and the bottom surface 412 of the main portion 41) may be substantially coplanar with the bottom surface 22 of the upper mold 2. Meanwhile, the gap G between the top surface 31 of the lower mold 3 and the bottom surface of the middle mold 4 has not changed.

Referring to FIG. 3A and FIG. 3B, the relative movement between the upper mold 2 and the lower mold 3 continues until the distance between the upper mold 2 and the lower mold 3 is reduced to zero. FIG. 3A is a schematic perspective view of the molding device 1 at a third manufacturing stage according to some embodiments of the present invention. FIG. 3B is a side view of the molding device 1 of FIG. 3A. In some embodiments, the position of the upper mold 2 may be fixed, the middle mold 4 may sustain the upper mold 2, and the lower mold 3 may move toward the upper mold 2. In some embodiments, the position of the lower mold 3 may be fixed, and the upper mold 2 and the middle mold 4 may move together toward the lower mold 3. In some embodiments, the lower mold 3 and the upper mold 2 may move toward each other. Thus, the gap G between the top surface 31 of the lower mold 3 and the bottom surface of the middle mold 4 has reduced to zero. The upper mold 2 may apply a downward force on the middle mold 4 to drive the middle mold 4 to move downward to press the elastic mechanism 52. Therefore, an elastic potential energy is stored in the pressed elastic mechanism 52.

As shown in FIG. 3A and FIG. 3B, the molding device 1 is in a closed configuration, and the upper mold 2 is engaged with the lower mold 3. The bottom surface 22 of the upper mold 2 and the bottom surface 412 of the main portion 41 may contact the top surface 31 of the lower mold 3. Thus, the upper mold 2 and the lower mold 3 may jointly define an accommodating space 12 for accommodating the middle mold 4. It can be understood that the accommodating space 12 may be substantially same as the recess portion 23 of the upper mold 2. The whole middle mold 4 is disposed and accommodated in the accommodating space 12. In addition, the upper mold 2, the middle mold 4 and the lower mold 3 may jointly define a mold cavity 14. The mold cavity 14 is configured to accommodate a material and allows the material to be made into a molded article having predetermined shape by mold forming. The passage 24 of the upper mold 2 is in communication with the mold cavity 14. In some embodiments, the opening 241 of the passage 24 may be coupled with an injection molding machine or extrusion molding machine, so that the material may be injected/extruded into the mold cavity 14 from the injection molding machine or extrusion molding machine and formed the predetermined shape therein.

As shown in FIG. 3A and FIG. 3B, the mold cavity 14 may include a first portion 141 and a second portion 142 in communication with each other. The first portion 141 may be defined by the second inner face 232 of the upper mold 2 and the sidewalls of the recess 43 of the shoe last 42. It can be understood that the first portion 141 of the mold cavity 14 may be substantially same as the recess 43 of the shoe last 42. Further, the second portion 142 may be defined by the sidewalls of the recess portion 33 of the lower mold 3, the bottom surface of the middle mold 4 (including the bottom surface 422 of the shoe last 42 and the bottom surface 412 of the main portion 41) and the bottom surface 22 of the upper mold 2. It can be understood that the second portion 142 of the mold cavity 14 may be substantially same as the recess portion 33 of the lower mold 3.

Figure 4A:
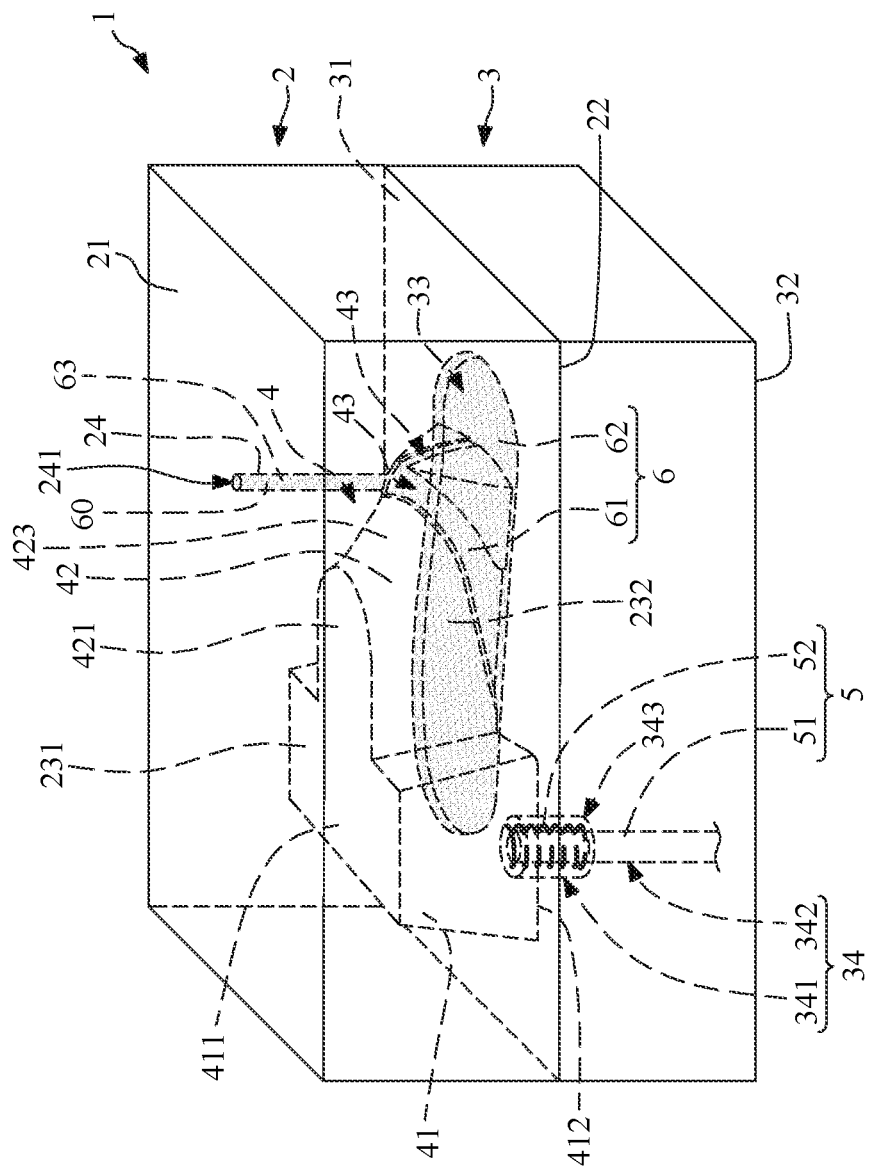
FIG. 4A is a schematic perspective view of a molding device at one or more manufacturing stages of a molding method according to some embodiments of the present invention.
Figure 4B:
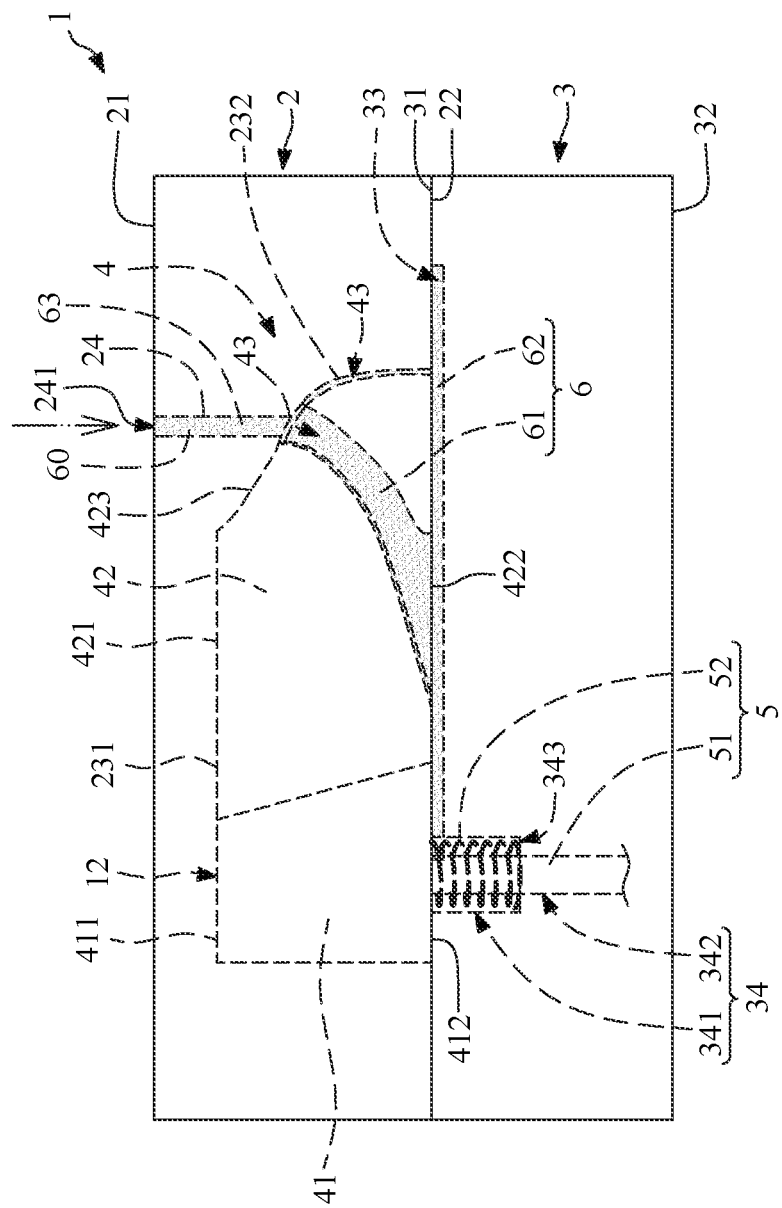
FIG. 4B is a side view of the molding device of FIG. 4A.

Referring to FIG. 4A and FIG. 4B, a material 60 may be injected into the mold cavity 14 through the opening 241 of the passage 24. The material 60 may at least partially surround the middle mold 4. FIG. 4A is a schematic perspective view of the molding device 1 at a fourth manufacturing stage according to some embodiments of the present invention. FIG. 4B is a side view of the molding device 1 of FIG. 4A. In some embodiments, the material 60 is injected into the mold cavity 14 when the molding device 1 is in a closed configuration or when the upper mold 2 and the lower mold 3 are engaged with each other. In some embodiments, the material 60 may include thermoplastic polyurethane (TPU), polyurethane (PU), plastics or any other suitable materials. In some embodiments, the material 60 may be foamable material or less foamable material. In some embodiments, the material 60 may be non-foamable material. In some embodiments, the material 60 may fill up the mold cavity 14 (including the first portion 141 and the second portion 142).

Then, an article 6 is integrally formed from the material 60. The article 6 may be a shoe such as a slipper, flip-flop, or a sandal. The article 6 may include a base portion 62 (e.g., a sole portion) and at least one upper portion 61 (e.g., a strap portion). The upper portion 61 of the article 6 may be formed from a first portion of the material 60 disposed in the first portion 141 of the mold cavity 14. The base portion 62 of the article 6 may be formed from a second portion of the material 60 disposed in the second portion 142 of the mold cavity 14. In addition, an additional pin 63 may be formed from a third portion of the material 60 disposed in the passage 24. The additional pin 63 may be connected to the upper portion 61 of the article 6.

Figure 5A:
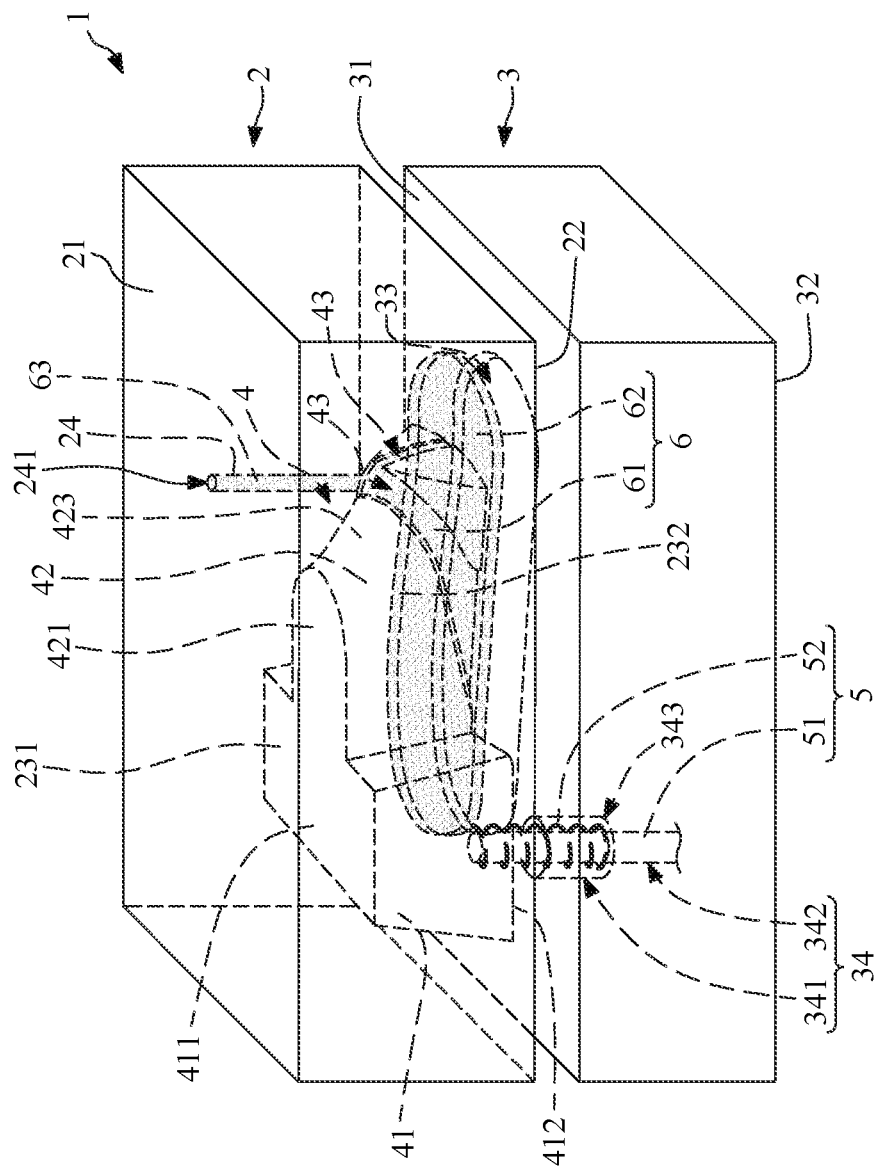
FIG. 5A is a schematic perspective view of a molding device at one or more manufacturing stages of a molding method according to some embodiments of the present invention.
Figure 5B:
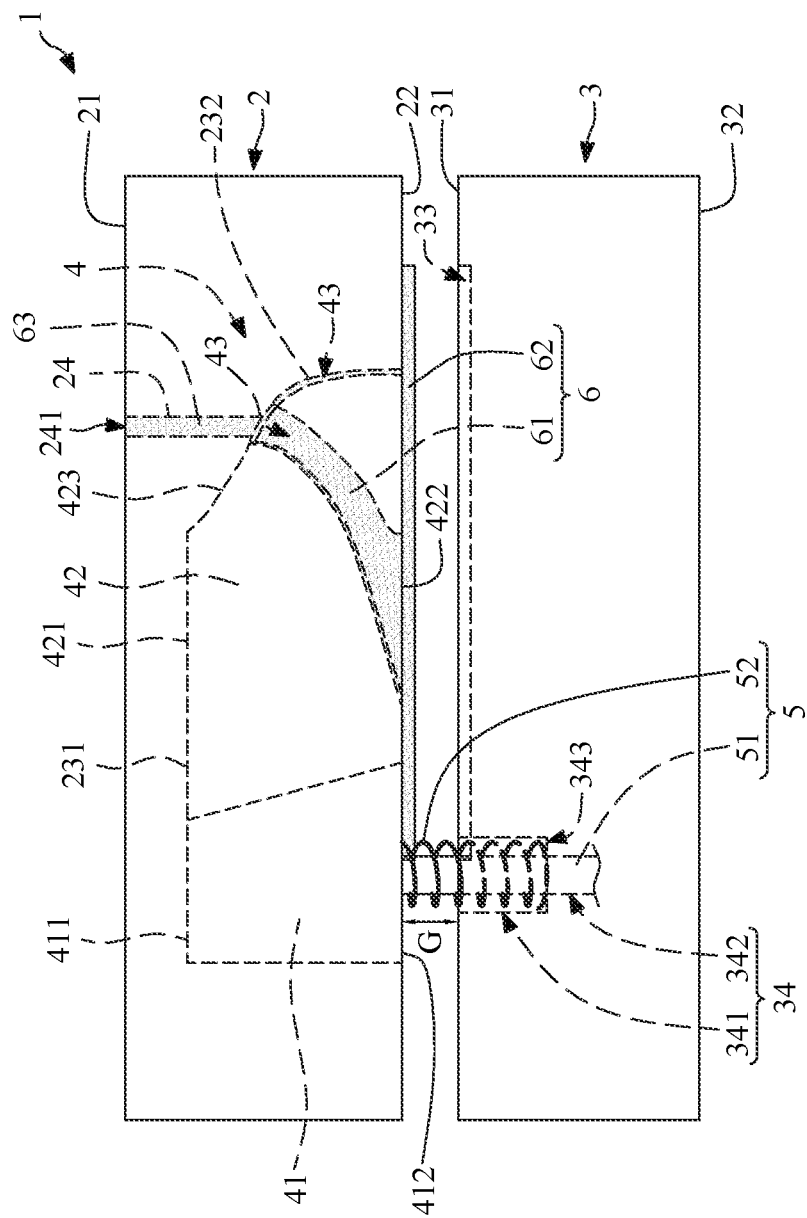
FIG. 5B is a side view of the molding device of FIG. 5A.

Referring to FIG. 5A and FIG. 5B, the lower mold 3 is disengaged from the upper mold 2. FIG. 5A is a schematic perspective view of the molding device 1 at a fifth manufacturing stage according to some embodiments of the present invention. FIG. 5B is a side view of the molding device 1 of FIG. 5A. The relative movement between the upper mold 2 and the lower mold 3 occurs, and the distance between the upper mold 2 and the lower mold 3 increases gradually. Meanwhile, the article 6 may be held or attached on the middle mold 4, and the additional pin 63 may be still attached on the article 6. In some embodiments, the position of the upper mold 2 may be fixed, and only the lower mold 3 may move away from the upper mold 2. Meanwhile, the middle mold 4 may sustain the upper mold 2 and may not move. The relative movement between the middle mold 4 and the lower mold 3 may be achieved by a pushing force applied to the middle mold 4 by the position control mechanism 5. Such pushing force is converted from the elastic potential energy stored in the pressed elastic mechanism 52 of FIG. 3A and FIG. 3B.

In some embodiments, the position of the lower mold 3 may be fixed, and the upper mold 2 and the middle mold 4 may move away from the lower mold 3 simultaneously. Meanwhile, the middle mold 4 may sustain the upper mold 2 and may move with the upper mold 2. The relative movement between the middle mold 4 and the lower mold 3 may be achieved by a pushing force applied to the middle mold 4 by the position control mechanism 5. Such pushing force is converted from the elastic potential energy stored in the pressed elastic mechanism 52 of FIG. 3A and FIG. 3B.

Figure 6A:
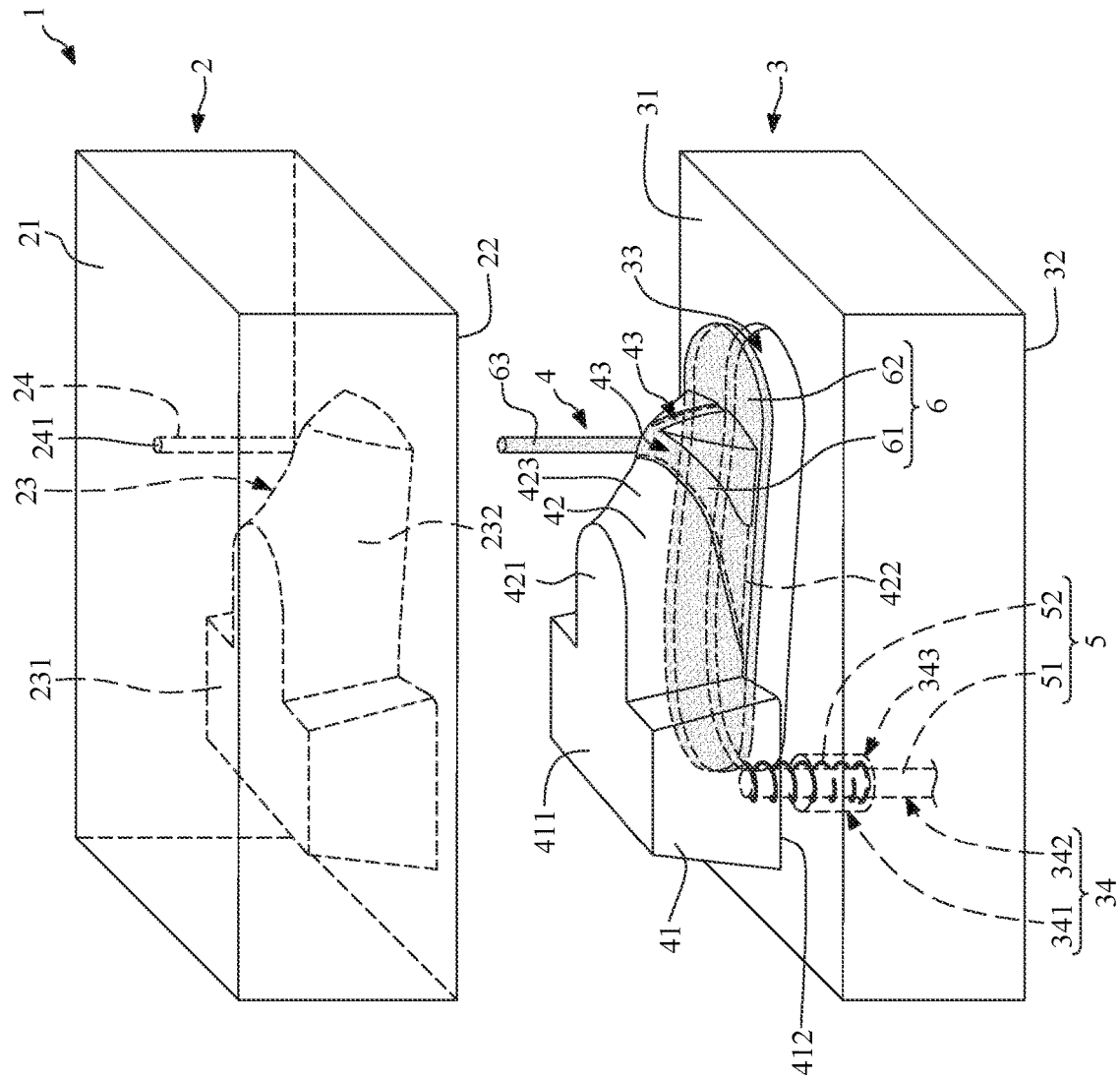
FIG. 6A is a schematic perspective view of a molding device at one or more manufacturing stages of a molding method according to some embodiments of the present invention.
Figure 6B:
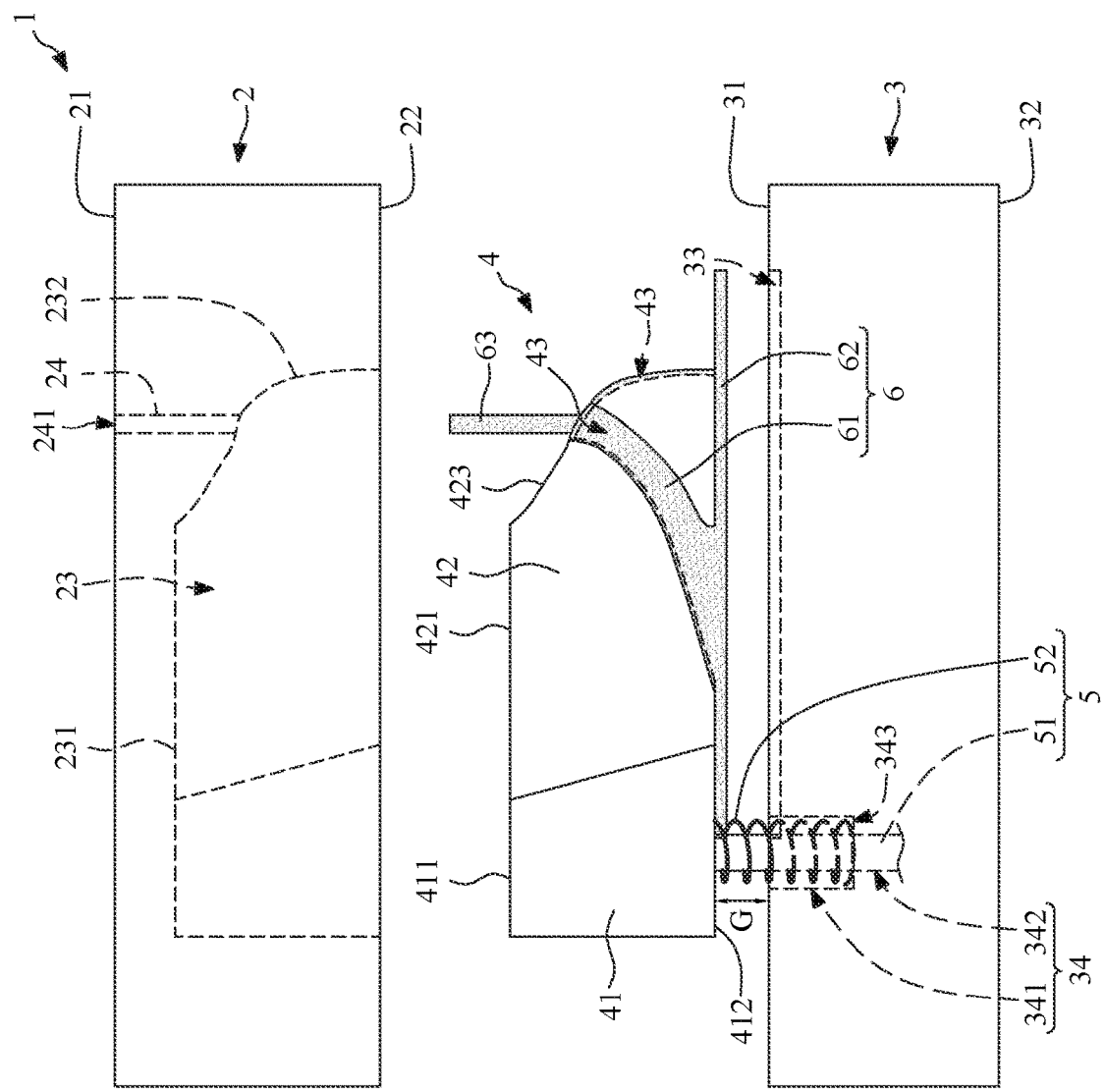
FIG. 6B is a side view of the molding device of FIG. 6A.

Referring to FIG. 6A and FIG. 6B, the relative movement between the upper mold 2 and the lower mold 3 continues so as to separate the upper mold 2 from the middle mold 4. FIG. 6A is a schematic perspective view of the molding device 1 at a sixth manufacturing stage according to some embodiments of the present invention. FIG. 6B is a side view of the molding device 1 of FIG. 6A. Meanwhile, the article 6 may remain on the middle mold 4. In some embodiments, the position of the upper mold 2 may be fixed, and the lower mold 3 and the middle mold 4 move together away from the upper mold 2 since a maximum displacement of the middle mold 4 is limited by the position control mechanism 5 attached to the lower mold 3. In some embodiments, the position of the lower mold 3 may be fixed, and the upper mold 2 may move away from the lower mold 3 and the middle mold 4. As shown in FIG. 6B, a distance between the middle mold 4 and the upper mold 2 may be greater than a distance between the middle mold 4 the lower mold 3.

Figure 7:
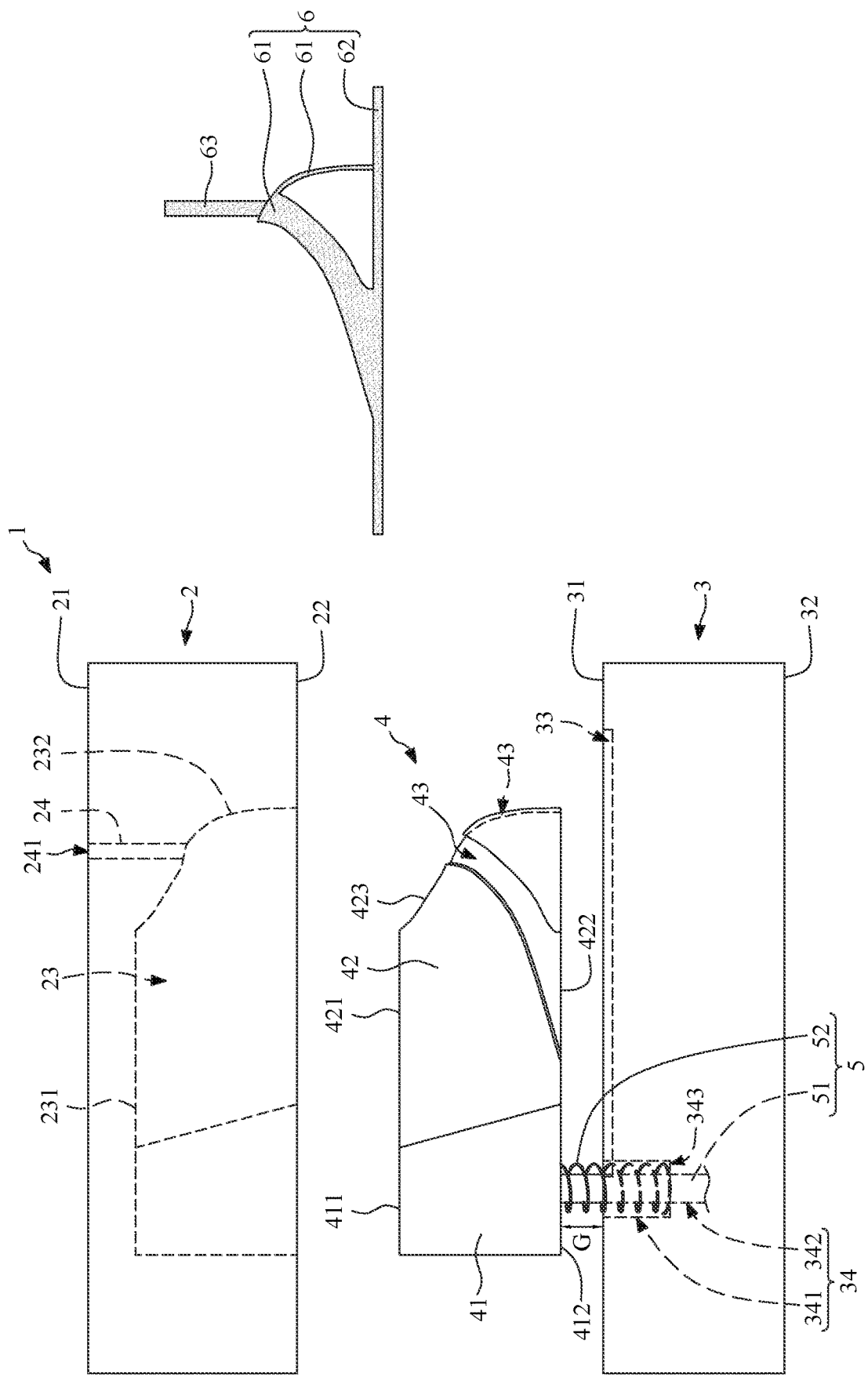
FIG. 7 is a schematic side view of a molding device at one or more manufacturing stages of a molding method according to some embodiments of the present invention.

Referring to FIG. 7, the article 6 may be detached from an upper side of the middle mold 4. FIG. 7 is a schematic side view of the molding device 1 at a seventh manufacturing stage according to some embodiments of the present invention. As shown in FIG. 7, the article 6 may be detached from the middle mold 4 through a space between the middle mold 4 and the upper mold 2. It can be understood that the gap G between the top surface 31 of the lower mold 3 and the bottom surface of the middle mold 4 can facilitate the detachment of the article 6.

Figure 8:
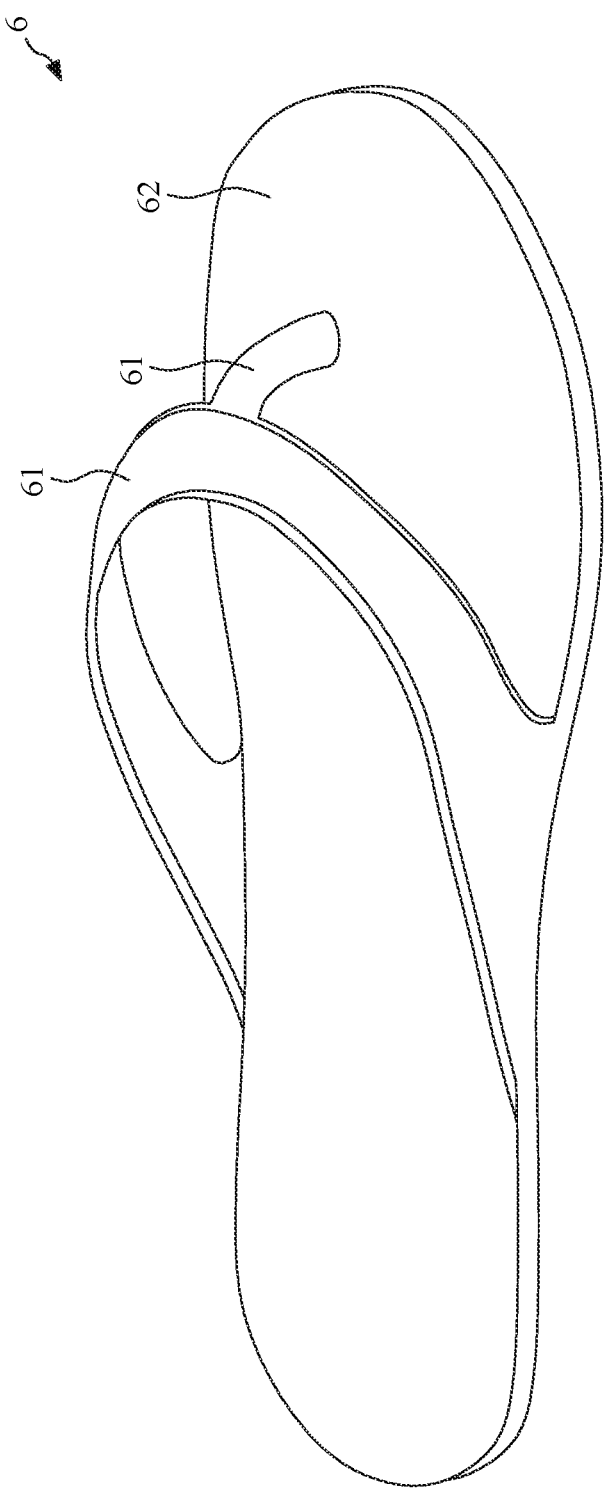
FIG. 8 is a schematic perspective view of the article according to some embodiments of the present invention.

Then, the additional pin 63 may be removed from the article 6 so as to obtain the article 6 as shown in FIG. 8.

FIG. 8 is a schematic perspective view of the article 6 according to some embodiments of the present invention. The article 6 may include a base portion 62 and at least one upper portion 61 connected to base portion 62. The base portion 62 and the upper portion 61 may be formed integrally and concurrently. Thus, there may be no interface between the base portion 62 and the upper portion 61.

FIG. 9 through FIG. 15 illustrate a molding method for manufacturing an article according to some embodiments of the present disclosure. In some embodiments, the method is for manufacturing the article 6 shown in FIG. 8.

Figure 9:
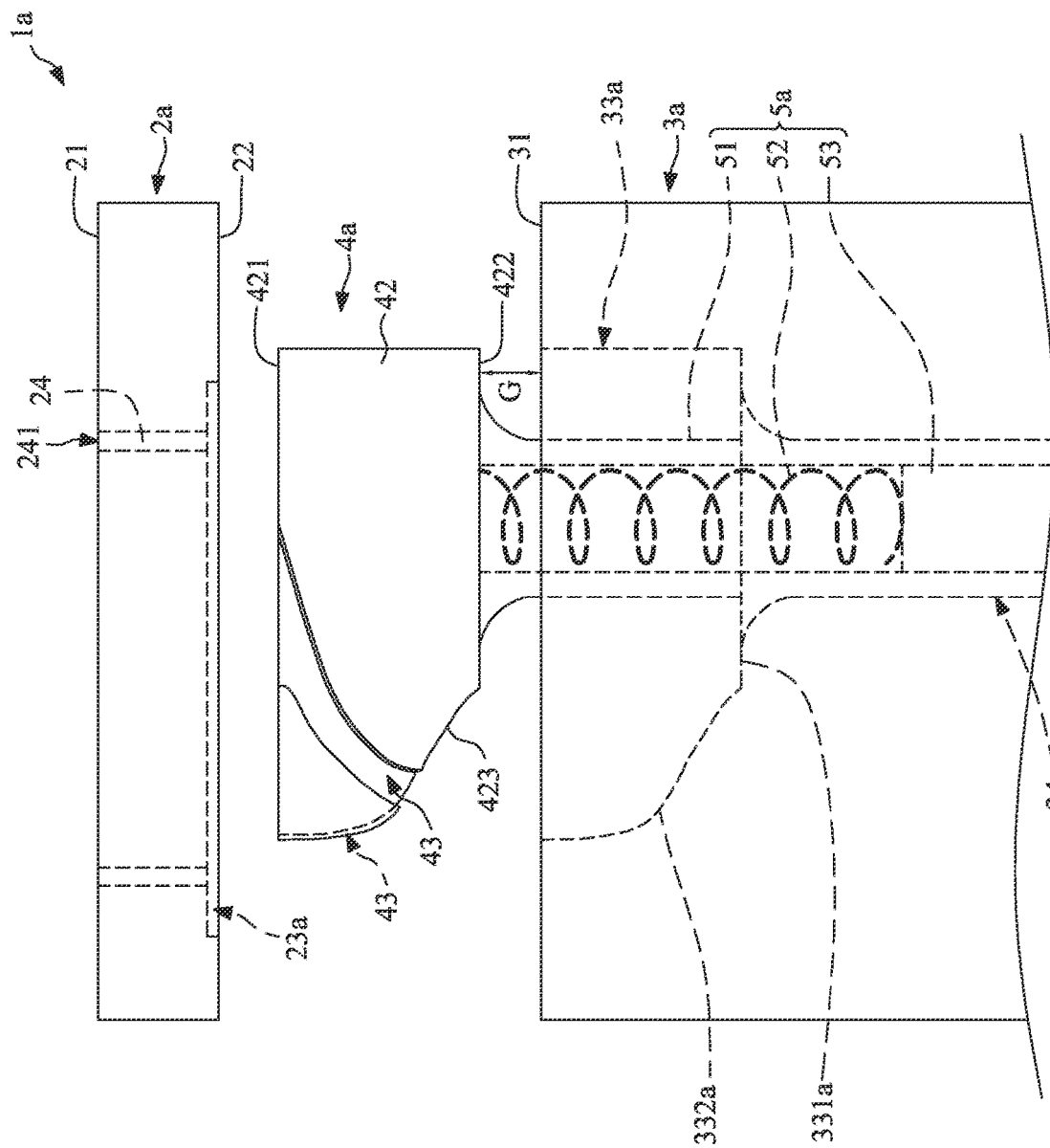
FIG. 9 is a schematic side view of a molding device at one or more manufacturing stages of a molding method according to some embodiments of the present invention.

Referring to FIG. 9, a molding device 1a is provided. The molding device 1a of FIG. 9 is similar to the molding device 1 of FIG. 1A and FIG. 1B, except that the middle mold 4a is upside down. The molding device 1a may include an upper mold 2a, a lower mold 3a, a middle mold 4a and a position control mechanism 5a. In the embodiment illustrated in FIG. 9, the molding device 1a is in an open configuration.

The upper mold 2a may have a top surface 21 and a bottom surface 22 opposite to the top surface 21. The upper mold 2a may define a recess portion 23a and at least one passage 24. The bottom surface 22 of the upper mold 2a may face the lower mold 3a and the middle mold 4a. The recess portion 23a of the upper mold 2a may be recessed from the bottom surface 22 of the upper mold 2. A configuration (e.g., dimension or shape) of the recess portion 23a of the upper mold 2a may correspond to a configuration (e.g., dimension or shape) of a top surface 421 of the middle mold 4a. A position of the recess portion 23a of the upper mold 2a may be right above the middle mold 4a. The recess portion 23a of the upper mold 2a of FIG. 9 may be similar to the recess portion 33 of the lower mold 3 of FIG. 1A and FIG. 1B.

Figure 11:
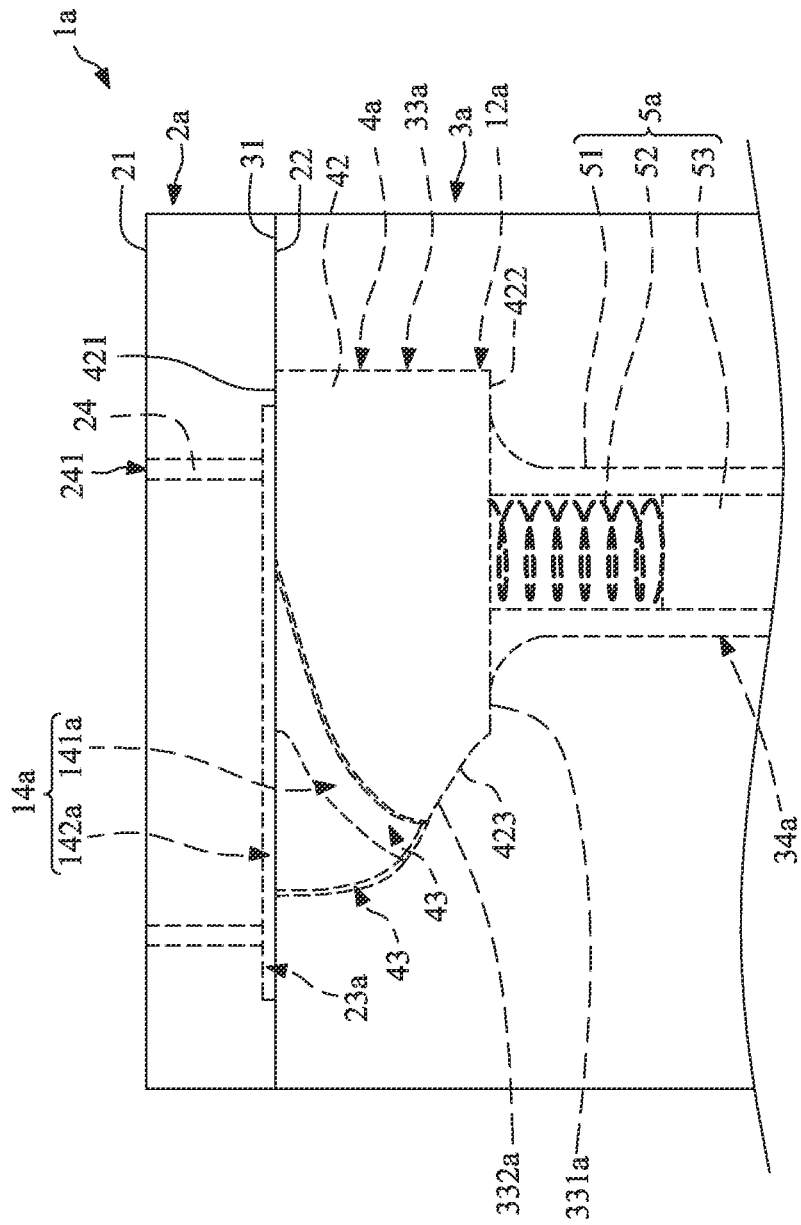
FIG. 11 is a schematic side view of a molding device at one or more manufacturing stages of a molding method according to some embodiments of the present invention.

In some embodiments, the passage 24 may extend through the upper mold 2a, and may have an opening 241 on the top surface 21 of the upper mold 2a. In some embodiments, the passage 24 may be communicable with the recess portion 23a of the upper mold 2a or the mold cavity 14a when the molding device 1a is in the closed configuration as shown in FIG. 11. Alternatively, the passage 24 may be in communication with the recess portion 23a of the upper mold 2a. Thus, the recess portion 23a of the upper mold 2a may be accessible through the passage 24.

The lower mold 3a may be disposed below the upper mold 2a. The lower mold 3a may have a top surface 31 and a bottom surface (not shown) opposite to the top surface 31. The lower mold 3a may define a recess portion 33a and a hole structure 34a. The top surface 31 of the lower mold 3a may face the upper mold 2a and the middle mold 4a. The recess portion 33a of the lower mold 3a may be recessed from the top surface 31a of the lower mold 3a.

A configuration (e.g., dimension or shape) of recess portion 33a of the lower mold 3a may correspond to a configuration (e.g., dimension or shape) of the middle mold 4a. The recess portion 33a of the lower mold 3a may be a portion of the mold cavity 14a when the molding device 1a is in the closed configuration as shown in FIG. 11. The recess portion 33a of the lower mold 3a may include a first inner surface 331a and a second inner face 332a. The second inner face 332a may extend between the first inner surface 331a and the top surface 31 of the lower mold 3a. The first inner surface 331a and the second inner face 332a may be substantially conformal with the middle mold 4a. The recess portion 33a of the lower mold 3a of FIG. 9 may be similar to the recess portion 23 of the upper mold 2 of FIG. 1A and FIG. 1B.

In some embodiments, the hole structure 34a may be disposed under the recess portion 33a of the lower mold 3a, and in communication with the recess portion 33a of the lower mold 3a. In some embodiments, the hole structure 34a may be used for accommodating at least a portion of the position control mechanism 5a.

The middle mold 4a may be disposed between the upper mold 2a and the lower mold 3a, and may be moveably attached to the lower mold 3a through the position control mechanism 5a. The middle mold 4a may be moveable between the upper mold 2a and the lower mold 3a due to the operation of the position control mechanism 5a. In some embodiments, the position control mechanism 5a can drive or actuate the middle mold 4a to move along a direction between the upper mold 2a and the lower mold 3a, or along a height of the molding device 1a. It can be understood that a maximum displacement of the middle mold 4a is limited by the position control mechanism 5a. That is, the gap or distance between the middle mold 4a and the lower mold 3a is controlled by the position control mechanism 5a. Further, the gap or distance between the middle mold 4a and the upper mold 2a is not controlled by the position control mechanism 5a.

The middle mold 4a of FIG. 9 may be similar to the middle mold 4 of FIG. 1A and FIG. 1B, except that the main portion 41 of FIG. 1A and FIG. 1B may be omitted, and the middle mold 4a of FIG. 9 is upside down. As shown in FIG. 9, the middle mold 4a may include a shoe last 42. The shoe last 42 may have a top surface 421, a bottom surface 422 opposite to the top surface 421, and an outer surface 423 extending between the top surface 421 and the bottom surface 422. In addition, the shoe last 42 may define at least one recess 43 recessed from the outer surface 423. The recess 43 of the middle mold 4a may be a portion of the mold cavity 14a when the molding device 1a is in the closed configuration as shown in FIG. 11.

The position control mechanism 5a may be connected or attached to the bottom surface 422 of the shoe last 42 of the middle mold 4a. The position control mechanism 5a may drive or actuate the middle mold 4a to move upward so as to generate a gap G between the top surface 31 of the lower mold 3a and the bottom surface 422 of the shoe last 42 when the molding device 1a is in an open configuration. That is, the position control mechanism 5a may generate the relative movement between the middle mold 4a and the lower mold 3a. As shown in FIG. 9, the molding device 1a is in an open configuration, and the gap G reaches its maximum value.

In some embodiments, a portion of the position control mechanism 5a may be accommodated in the hole structure 34a of the lower mold 3a. Thus, when the molding device 1a is in a closed configuration, the whole position control mechanism 5a may be accommodated in the hole structure 34a of the lower mold 3a.

As shown in FIG. 9, the position control mechanism 5a may an ejector 51, an elastic mechanism 52 and a fixed support 53. The ejector 51 may be a pin, a pillar, a post or a column, and may be used for guiding the moving direction of the middle mold 4a. An upper end of the ejector 51 may be connected or attached to the bottom surface 422 of the shoe last 42 of the middle mold 4a, and a lower end of the ejector 51 may extend into the hole structure 34a and may slide in the hole structure 34a. The elastic mechanism 52 may be used for controlling a movement of the ejector 51 or driving the ejector 51. For example, the elastic mechanism 52 may be a spring or an elastic body that disposed in a center hollow of the ejector 51. An upper end of the elastic mechanism 52 may be connected or attached to the bottom surface 422 of the shoe last 42 of the middle mold 4a, and a lower end of the elastic mechanism 52 may be connected or attached to the fixed support 53. When a downward force is applied on the middle mold 4a to drive the middle mold 4a to move downward to press the elastic mechanism 52, an elastic potential energy is stored in the pressed elastic mechanism 52. Once the downward force is released, the elastic potential energy will push the middle mold 4a to move upward. It can be understood that the position control mechanism 5a may be a piston or other suitable mechanism that has a compression phase and a springback phase. In some embodiments, the elastic mechanism 52 may be omitted, and the lower end of the ejector 51 may be connected to a suitable actuator. Thus, the movement of the ejector 51 may not controlled by the elastic potential energy.

Figure 10:
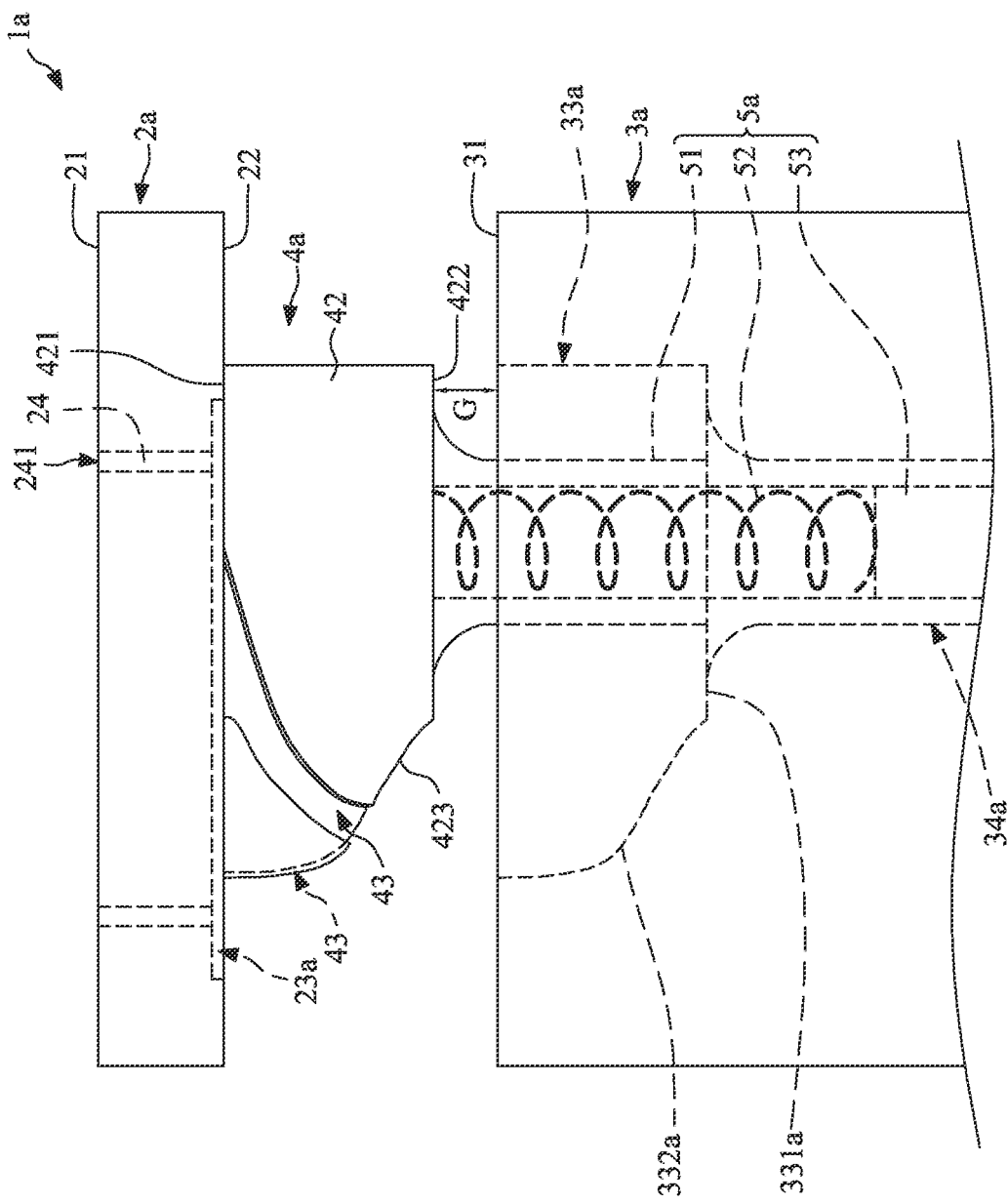
FIG. 10 is a schematic side view of a molding device at one or more manufacturing stages of a molding method according to some embodiments of the present invention.

Referring to FIG. 10, a distance between the upper mold 2a and the lower mold 3a is reduced gradually. A relative movement between the upper mold 2a and the lower mold 3a occurs. In some embodiments, the position of the upper mold 2a may be fixed, and the lower mold 3a and the middle mold 4a may move together toward the upper mold 2a. In some embodiments, the positions of the lower mold 3a and the middle mold 4a may be fixed, and the upper mold 2a may move toward the lower mold 3a and the middle mold 4a. In some embodiments, the lower mold 3a and the upper mold 2a may move toward each other. At the stage illustrated in FIG. 10, the middle mold 4a has contacted the upper mold 2a, but the lower mold 3a has not contacted the upper mold 2a yet. Meanwhile, the gap G between the top surface 31 of the lower mold 3a and the bottom surface 422 of the middle mold 4a has not changed.

Referring to FIG. 11, the relative movement between the upper mold 2a and the lower mold 3a continues until the distance between the upper mold 2a and the lower mold 3a is reduced to zero. In some embodiments, the position of the upper mold 2a may be fixed, the middle mold 4a may sustain the upper mold 2a, and the lower mold 3a may move toward the upper mold 2a. In some embodiments, the position of the lower mold 3a may be fixed, and the upper mold 2a and the middle mold 4a may move together toward the lower mold 3a. In some embodiments, the lower mold 3a and the upper mold 2a may move toward each other. Thus, the gap G between the top surface 31 of the lower mold 3a and the bottom surface 422 of the middle mold 4a has reduced to zero. The upper mold 2a may apply a downward force on the middle mold 4a to drive the middle mold 4a to move downward to press the elastic mechanism 52. Therefore, an elastic potential energy is stored in the pressed elastic mechanism 52.

As shown in 11, the molding device 1 is in a closed configuration, and the upper mold 2a is engaged with the lower mold 3a. The bottom surface 22 of the upper mold 2a may contact the top surface 31 of the lower mold 3a. Thus, the upper mold 2a and the lower mold 3a may jointly define an accommodating space 12a for accommodating the middle mold 4a. It can be understood that the accommodating space 12a may be substantially same as the recess portion 33a of the lower mold 3a. For example, the middle mold 4a may be accommodated in the recess portion 33a of the lower mold 3a. The first inner surface 331a of the lower mold 3a may contact the bottom surface 422 of the shoe last 42 of the middle mold 4a. The second inner face 332a of the lower mold 3a may contact the outer surface 423 of the middle mold 4a. In some embodiments, the top surface 421 of the shoe last 42 of the middle mold 4a may be substantially coplanar with the top surface 31 of the lower mold 3a.

In addition, the upper mold 2a, the middle mold 4a and the lower mold 3a may jointly define a mold cavity 14a. The mold cavity 14a is configured to accommodate a material and allows the material to be made into a molded article having predetermined shape by mold forming. The passage 24 of the upper mold 2a is in communication with the mold cavity 14a. In some embodiments, the opening 241 of the passage 24 may be coupled with an injection molding machine or extrusion molding machine, so that the material may be injected/extruded into the mold cavity 14a from the injection molding machine or extrusion molding machine and formed the predetermined shape therein.

The mold cavity 14a of FIG. 11 may be similar to the mold cavity 14 of FIG. 1A and FIG. 1B, and may include a first portion 141a and a second portion 142a in communication with each other. The first portion 141a may be defined by the second inner face 332a of the lower mold 3a and the sidewalls of the recess 43 of the shoe last 42. It can be understood that the first portion 141a of the mold cavity 14a may be substantially same as the recess 43 of the shoe last 42. Further, the second portion 142a may be defined by the sidewalls of the recess portion 23a of the upper mold 2a, the top surface 421 of the shoe last 42 of the middle mold 4a and the top surface 31 of the lower mold 3a. It can be understood that the second portion 142a of the mold cavity 14a may be substantially same as the recess portion 23a of the upper mold 2a.

Figure 12:
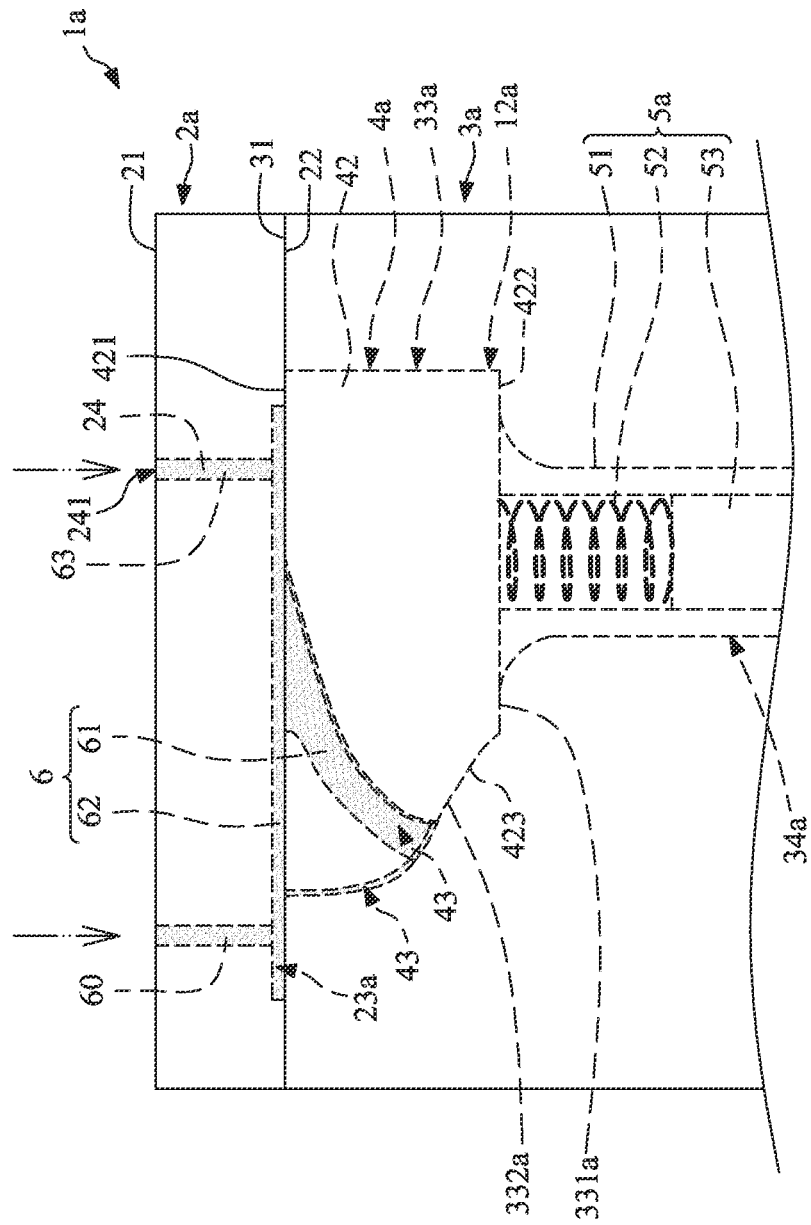
FIG. 12 is a schematic side view of a molding device at one or more manufacturing stages of a molding method according to some embodiments of the present invention.

Referring to FIG. 12, a material 60 may be injected into the mold cavity 14a through the opening 241 of the passage 24. The material 60 may at least partially surround the middle mold 4a. In some embodiments, the material 60 may fill up the mold cavity 14a (including the first portion 141a and the second portion 142a). Then, an article 6 is integrally formed from the material 60. The article 6 may be a shoe such as a slipper, flip-flop, or a sandal. The article 6 may include a base portion 62 (e.g., a sole portion) and at least one upper portion 61 (e.g., a strap portion). The upper portion 61 of the article 6 may be formed from a first portion of the material 60 disposed in the first portion 141a of the mold cavity 14a. The base portion 62 of the article 6 may be formed from a second portion of the material 60 disposed in the second portion 142a of the mold cavity 14a. In addition, at least one additional pin 63 may be formed from a third portion of the material 60 disposed in the passage 24. The additional pin 63 may be connected to the base portion 62 of the article 6.

Figure 13:
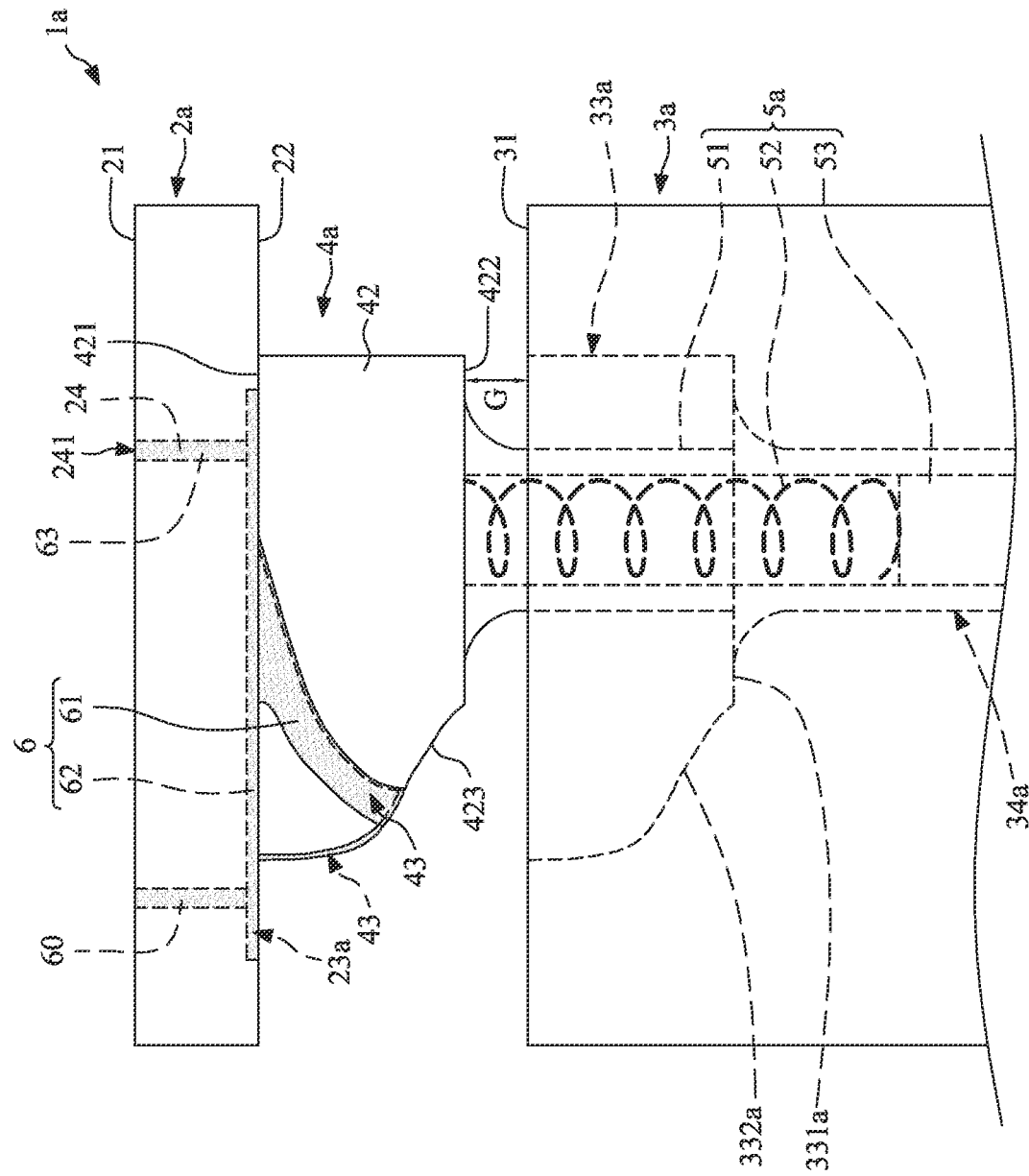
FIG. 13 is a schematic side view of a molding device at one or more manufacturing stages of a molding method according to some embodiments of the present invention.

Referring to FIG. 13, the lower mold 3a is disengaged from the upper mold 2a. The relative movement between the upper mold 2a and the lower mold 3a occurs, and the distance between the upper mold 2a and the lower mold 3a increases gradually. Meanwhile, the article 6 may be held or attached on the middle mold 4a, and the additional pin(s) 63 may be still attached on the article 6. In some embodiments, the position of the upper mold 2a may be fixed, and only the lower mold 3a may move away from the upper mold 2a. Meanwhile, the middle mold 4a may sustain the upper mold 2a and may not move. The relative movement between the middle mold 4a and the lower mold 3a may be achieved by a pushing force applied to the middle mold 4a by the position control mechanism 5a. Such pushing force is converted from the elastic potential energy stored in the pressed elastic mechanism 52 of FIG. 11.

In some embodiments, the position of the lower mold 3a may be fixed, and the upper mold 2a and the middle mold 4a may move away from the lower mold 3a simultaneously. Meanwhile, the middle mold 4a may sustain the upper mold 2a and may move with the upper mold 2a. The relative movement between the middle mold 4a and the lower mold 3a may be achieved by a pushing force applied to the middle mold 4a by the position control mechanism 5a. Such pushing force is converted from the elastic potential energy stored in the pressed elastic mechanism 52 of 11.

Figure 14:
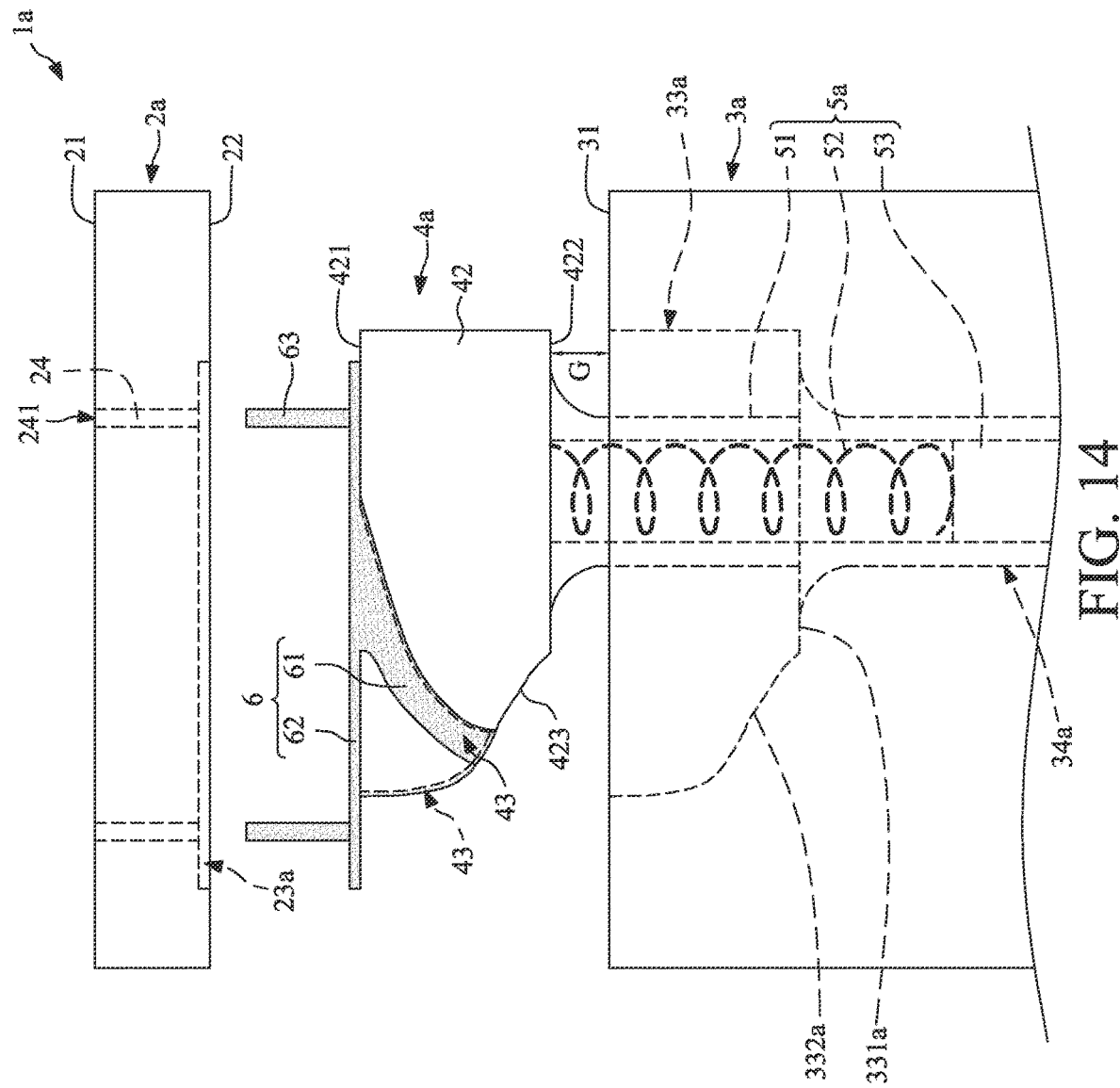
FIG. 14 is a schematic side view of a molding device at one or more manufacturing stages of a molding method according to some embodiments of the present invention.

Referring to FIG. 14, the relative movement between the upper mold 2a and the lower mold 3a continues so as to separate the upper mold 2a from the middle mold 4a. Meanwhile, the article 6 may remain on the middle mold 4a. In some embodiments, the position of the upper mold 2a may be fixed, and the lower mold 3a and the middle mold 4a move together away from the upper mold 2a since a maximum displacement of the middle mold 4a is limited by the position control mechanism 5a attached to the lower mold 3a. In some embodiments, the position of the lower mold 3a may be fixed, and the upper mold 2a may move away from the lower mold 3a and the middle mold 4a. As shown in FIG. 14, a distance between the middle mold 4a and the upper mold 2a may be greater than a distance between the middle mold 4a the lower mold 3a.

Figure 15:
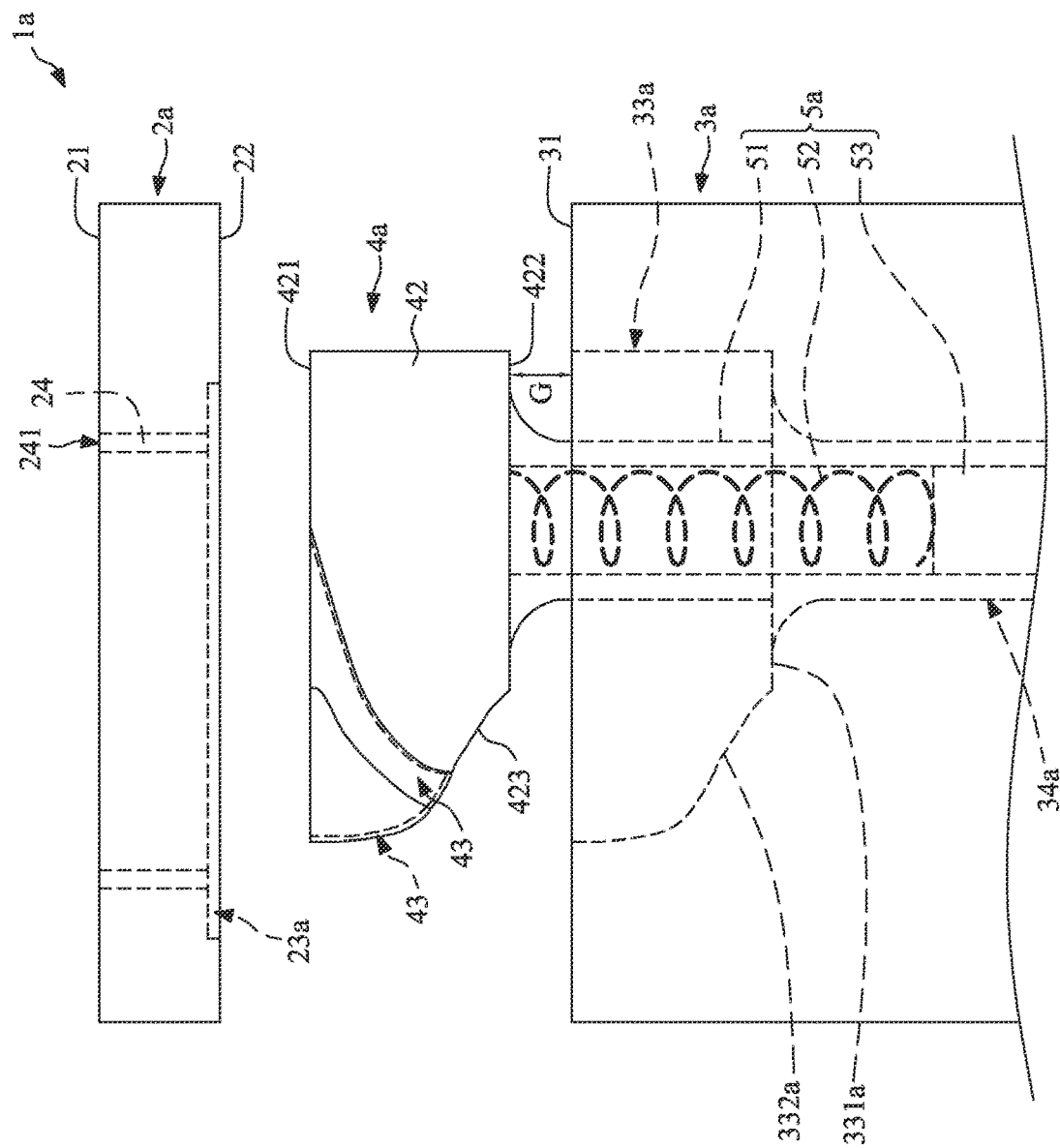
FIG. 15 is a schematic side view of a molding device at one or more manufacturing stages of a molding method according to some embodiments of the present invention.
Figure 15:
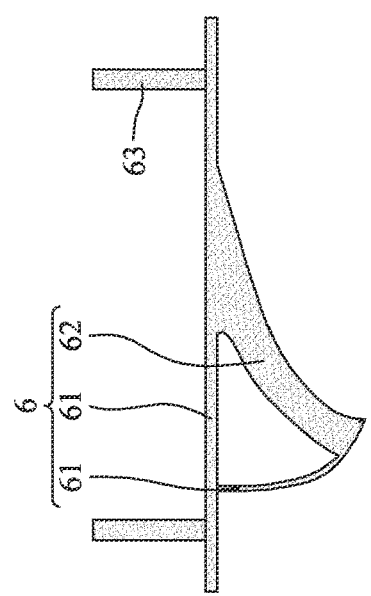

Referring to FIG. 15, the article 6 may be detached from an upper side of the middle mold 4a. As shown in FIG. 15, the article 6 may be detached from the middle mold 4a through a space between the middle mold 4a and the upper mold 2a. It can be understood that the gap G between the top surface 31 of the lower mold 3a and the bottom surface 422 of the middle mold 4a can facilitate the detachment of the article 6.

Then, the additional pin 63 may be removed from the article 6 so as to obtain the article 6 as shown in FIG. 8.

FIG. 16A through FIG. 20 illustrate a molding method for manufacturing an article according to some embodiments of the present disclosure. In some embodiments, the method is for manufacturing the article 6 shown in FIG. 8.

Figure 16A:
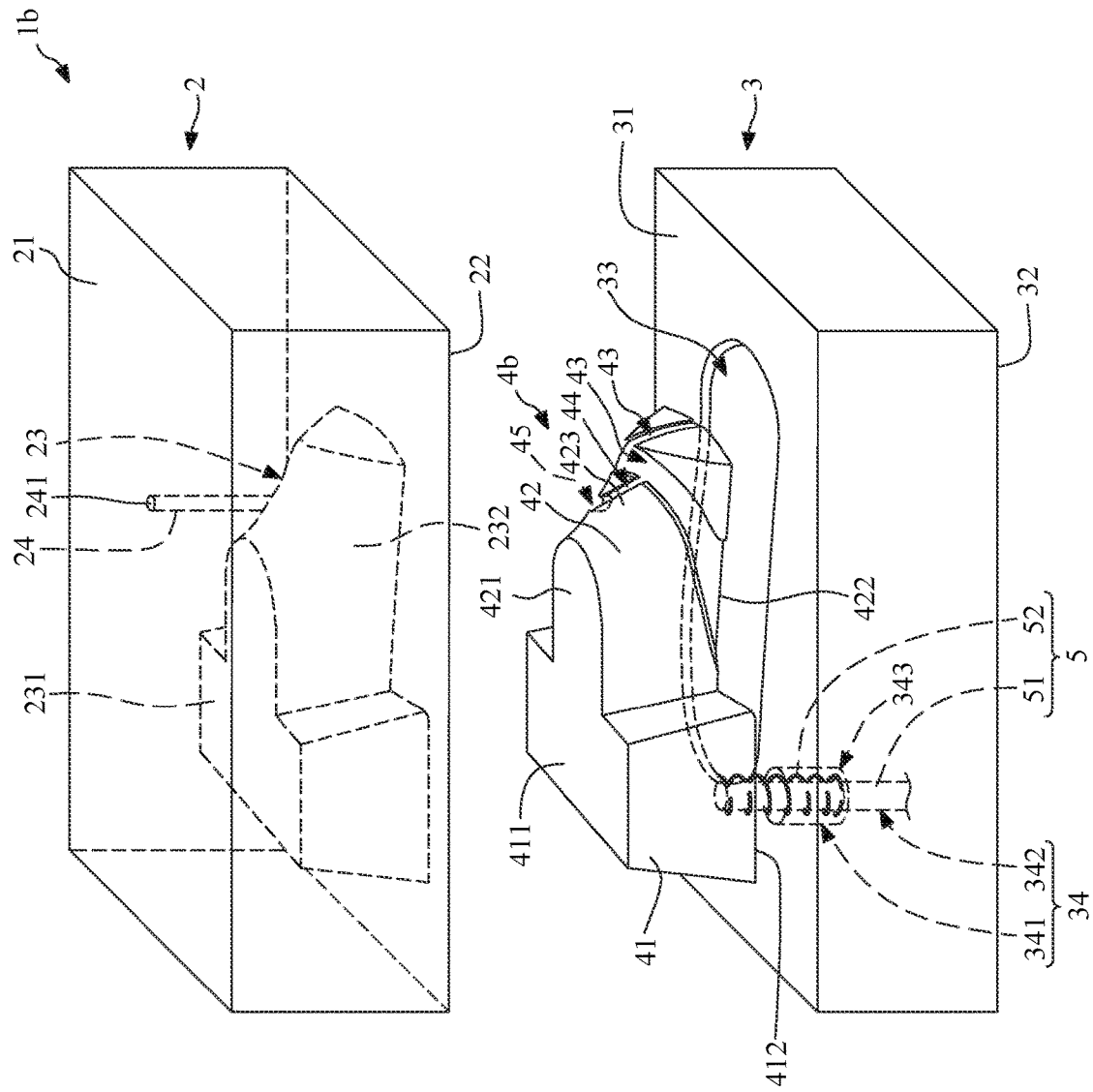
FIG. 16A is a schematic perspective view of a molding device at one or more manufacturing stages of a molding method according to some embodiments of the present invention.
Figure 16B:
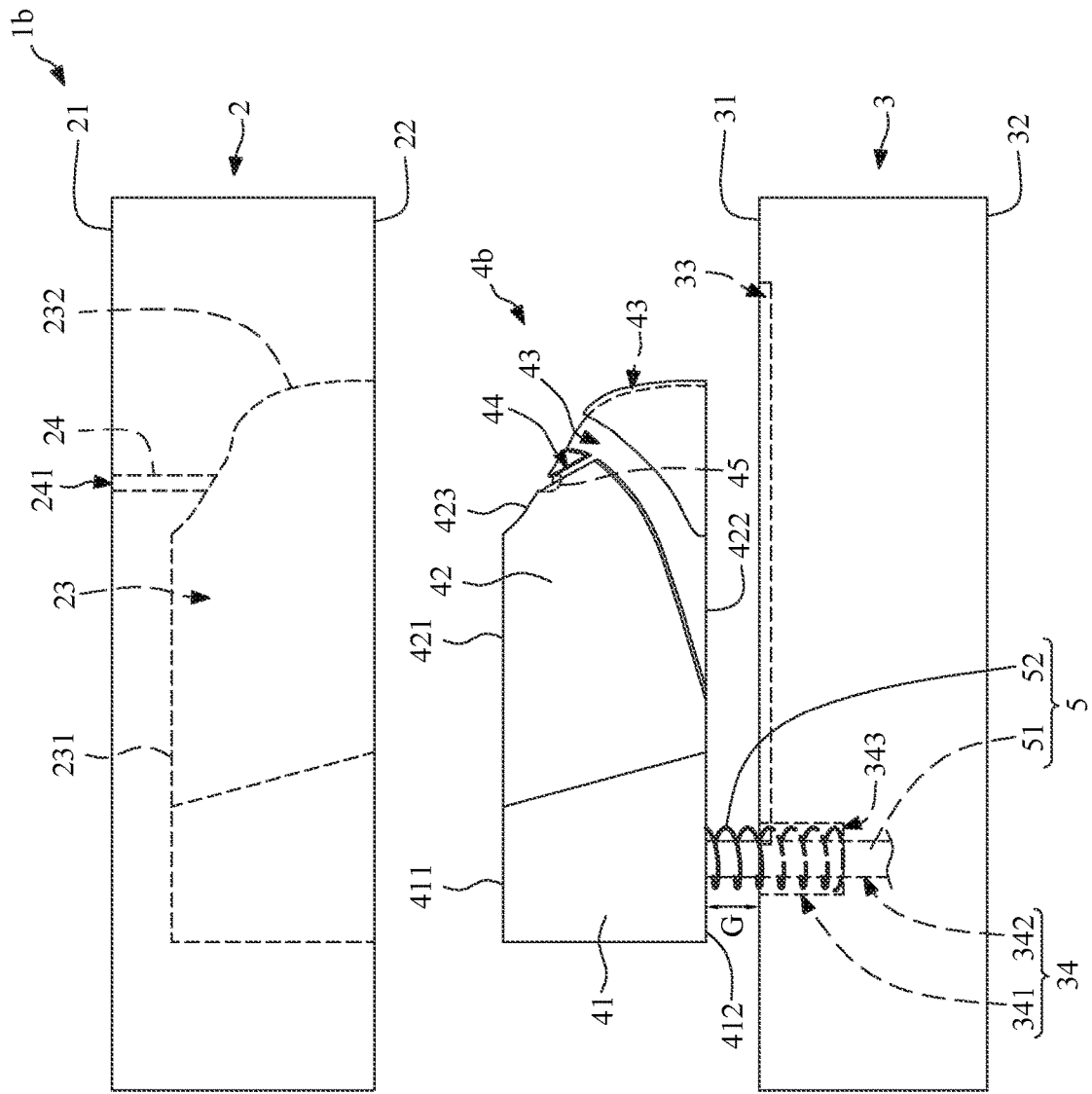
FIG. 16B is a side view of the molding device of FIG. 16A.

Referring to FIG. 16A and FIG. 16B, a molding device 1b is provided. The molding device 1b of FIG. 16A and FIG. 16B is similar to the molding device 1 of FIG. 1A and FIG. 1B, except that the shoe last 42 of the middle mold 4b may further define at least one notch 44 and an opening 45 recessed from the outer surface 423 and in communication with the recess 43. The location of the passage 24 of the upper mold 2 may correspond to the opening 45. A depth of the notch 44 may be less than a depth of the recess 43. A depth of the opening 45 may be greater than the depth of the notch 44 and the depth of the recess 43.

Figure 17A:
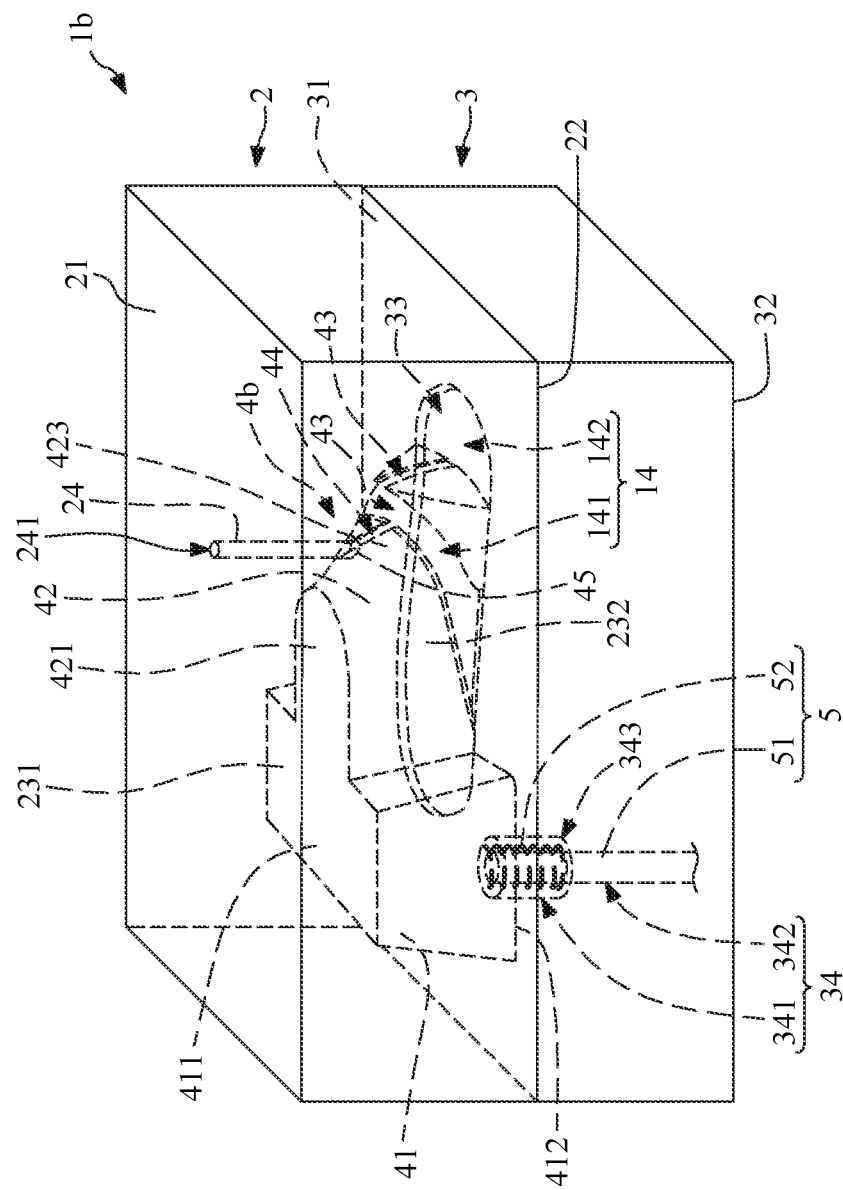
FIG. 17A is a schematic perspective view of a molding device at one or more manufacturing stages of a molding method according to some embodiments of the present invention.
Figure 17B:
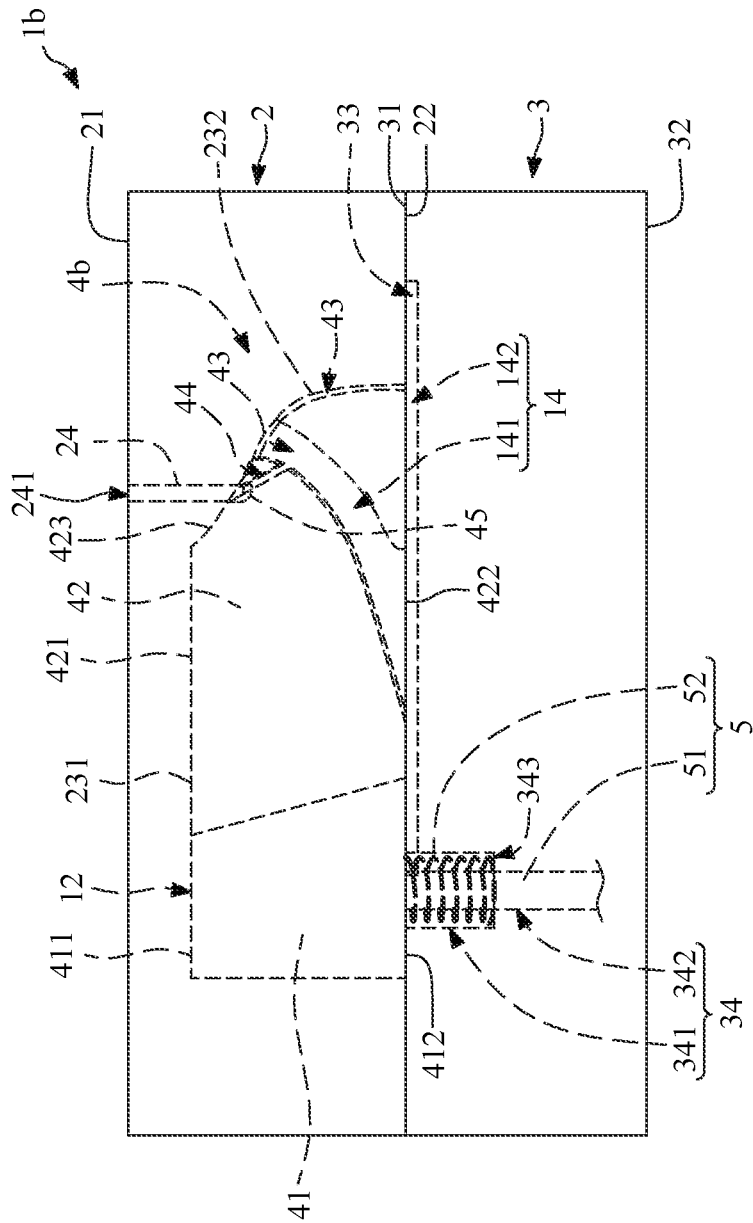
FIG. 17B is a side view of the molding device of FIG. 17A.

Referring to FIG. 17A and FIG. 17B, the molding device 1b is in a closed configuration. The notch 44, the opening 45 and the recess 43 of the middle mold 4b may be a portion of the mold cavity 14.

Figure 18A:
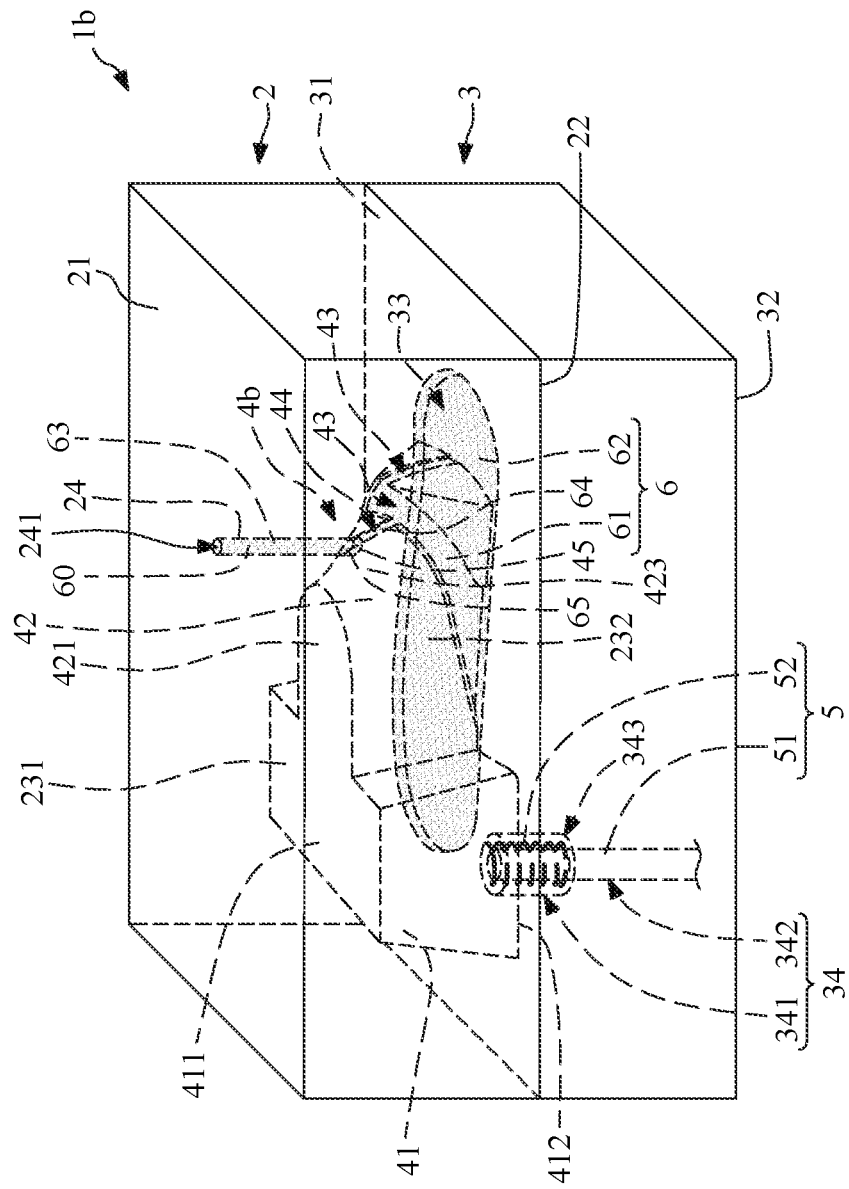
FIG. 18A is a schematic perspective view of a molding device at one or more manufacturing stages of a molding method according to some embodiments of the present invention.
Figure 18B:
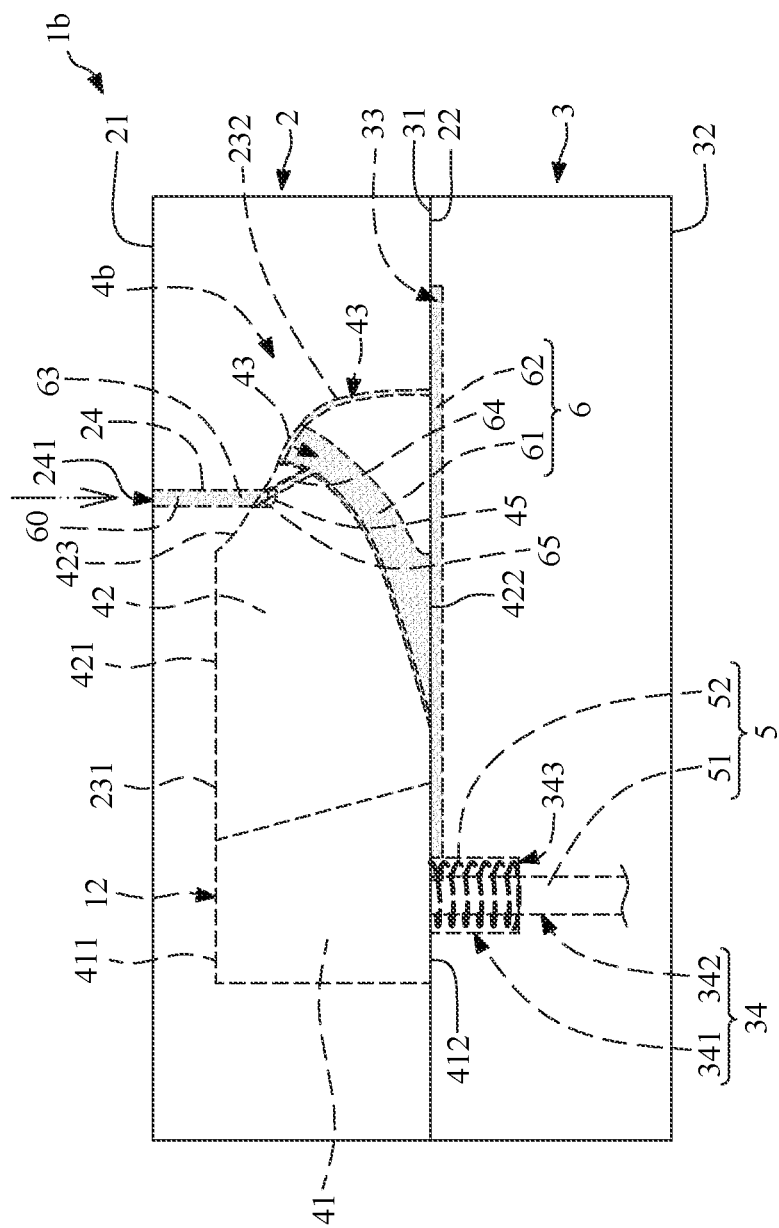
FIG. 18B is a side view of the molding device of FIG. 18A.

Referring to FIG. 18A and FIG. 18B, a material 60 may be injected into the mold cavity 14 through the opening 241 of the passage 24. Then, an article 6 is integrally formed from the material 60. The article 6 may include a base portion 62 (e.g., a sole portion), at least one upper portion 61 (e.g., a strap portion), at least one strip 64 and protrusion 65. In addition, at least one additional pin 63 may be formed on the protrusion 65. That is, the protrusion 65 may be below the additional pin 63. Further, the base portion 62, the upper portion 61, the strip 64, the protrusion 65 and the additional pin 63 may be formed integrally and concurrently. The upper portion 61 may be connected to the base portion 62. The additional pin 63 may be connected to the strip 64, and the strip 64 may be connected to the upper portion 61. A thickness of the protrusion 65 may be greater than a thickness of the strip 64 and a thickness of the upper portion 61. A thickness of the strip 64 may be less than the thickness of the upper portion 61.

Figure 19A:
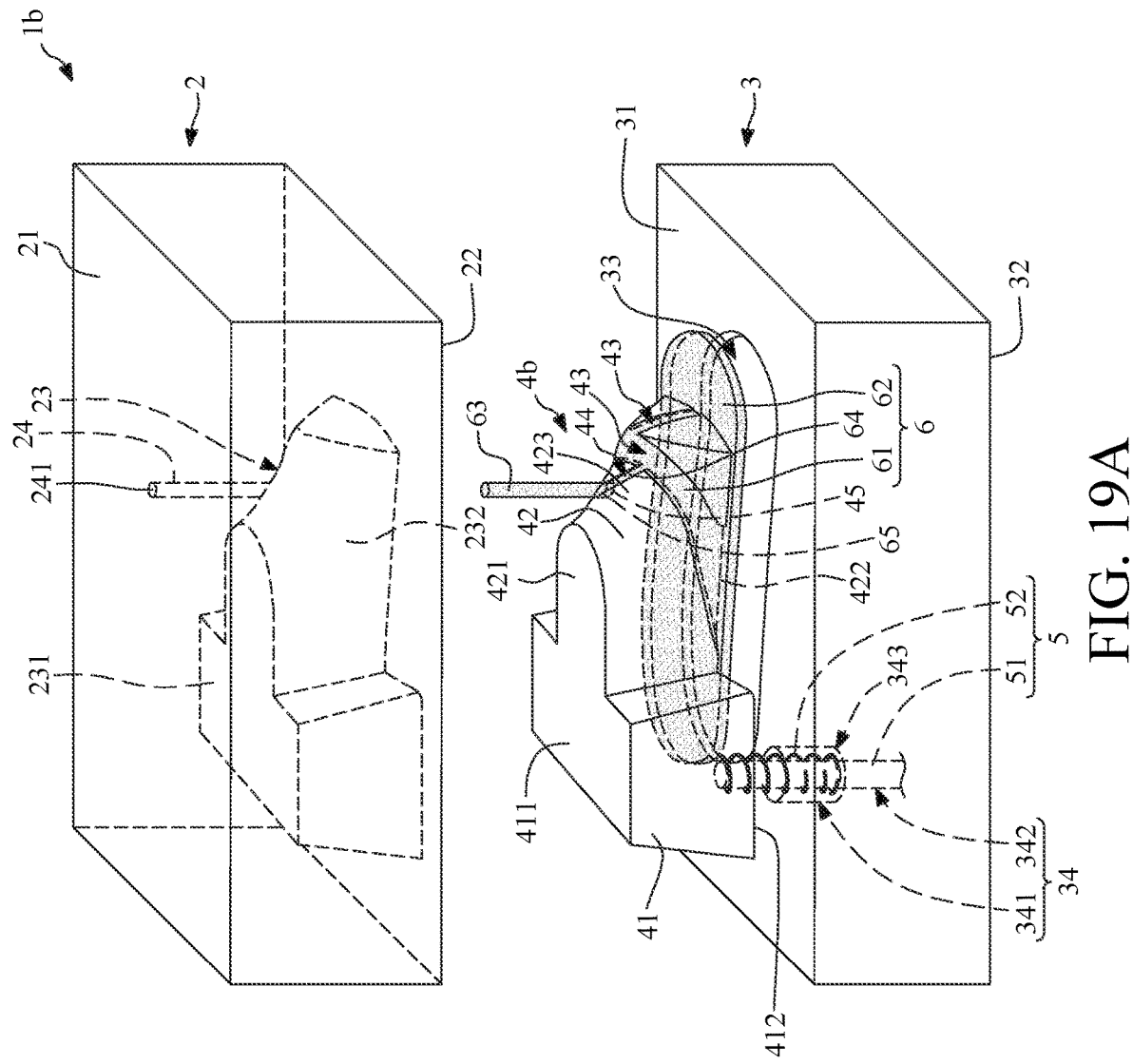
FIG. 19A is a schematic perspective view of a molding device at one or more manufacturing stages of a molding method according to some embodiments of the present invention.
Figure 19B:
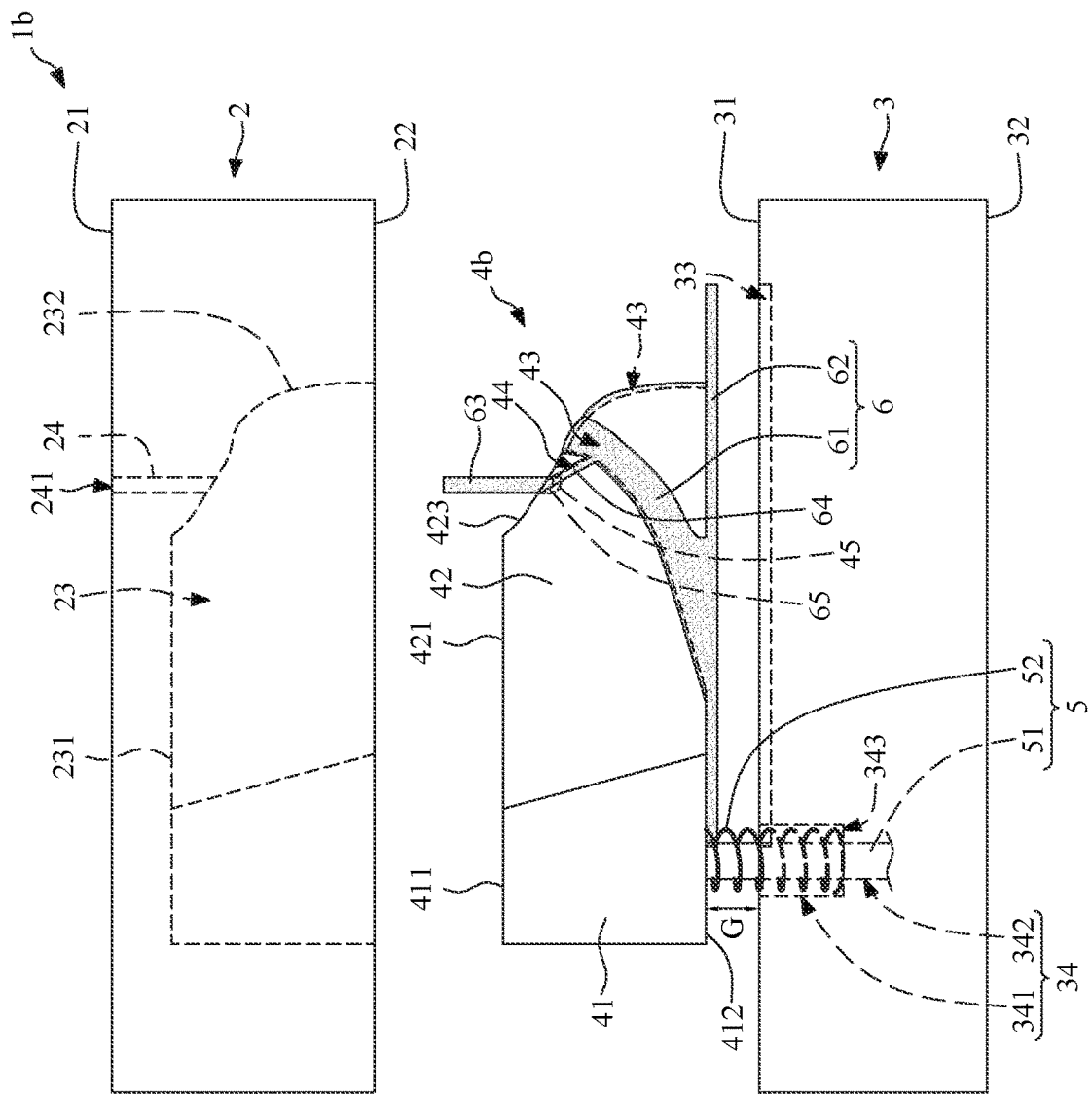
FIG. 19B is a side view of the molding device of FIG. 19A.

Referring to FIG. 19A and FIG. 19B, the lower mold 3 is disengaged from the upper mold 2.

Figure 20:
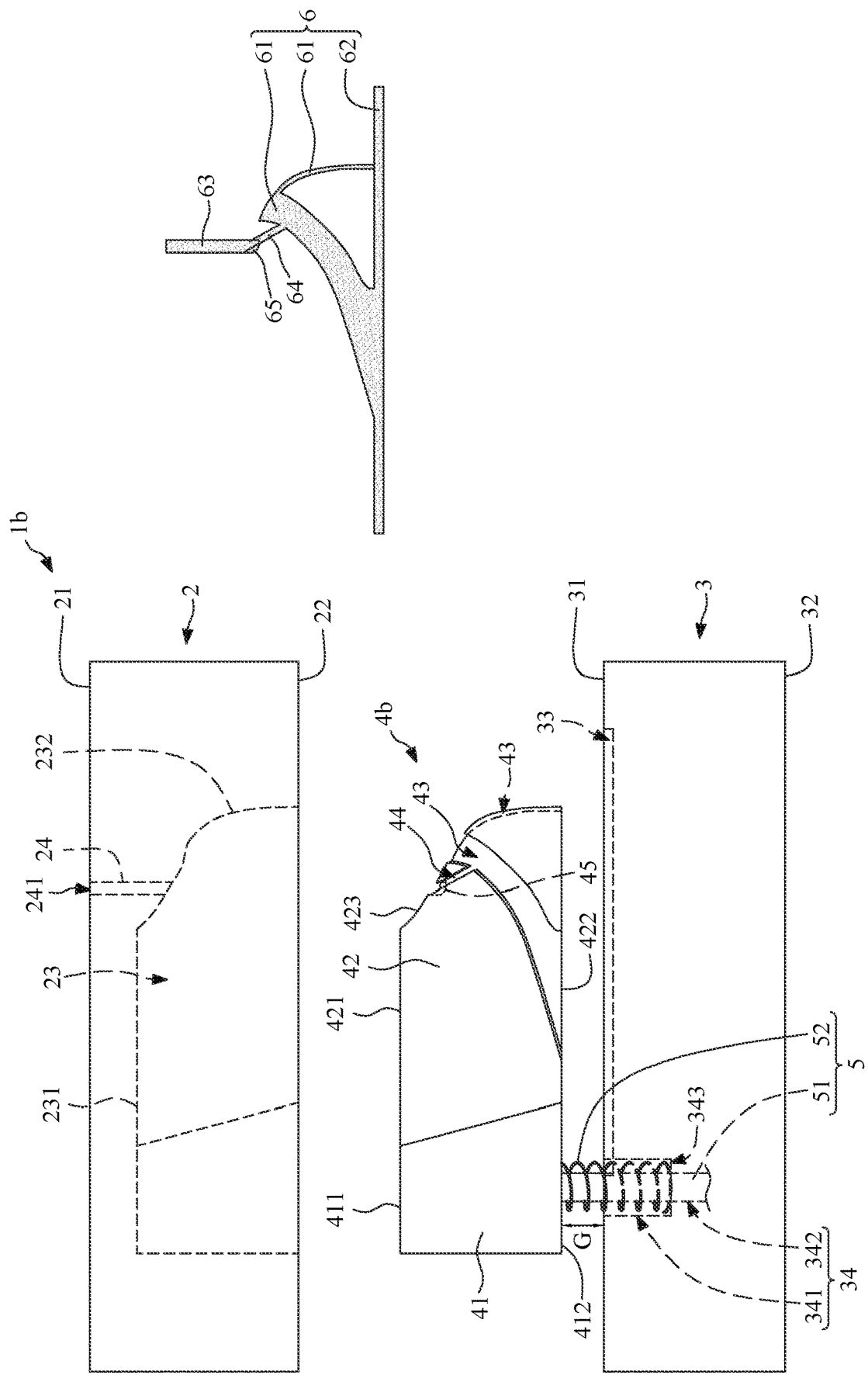
FIG. 20 is a schematic side view of a molding device at one or more manufacturing stages of a molding method according to some embodiments of the present invention.

Referring to FIG. 20, the article 6 may be detached from an upper side of the middle mold 4b.

Then, the additional pin 63, the protrusion 65 and the strip 64 may be removed from the article 6 so as to obtain the article 6 as shown in FIG. 8. In some embodiments, the additional pin 63, the protrusion 65 and the strip 64 are removed from the article 6 by cutting or shearing the strip 64.

Figure 21:
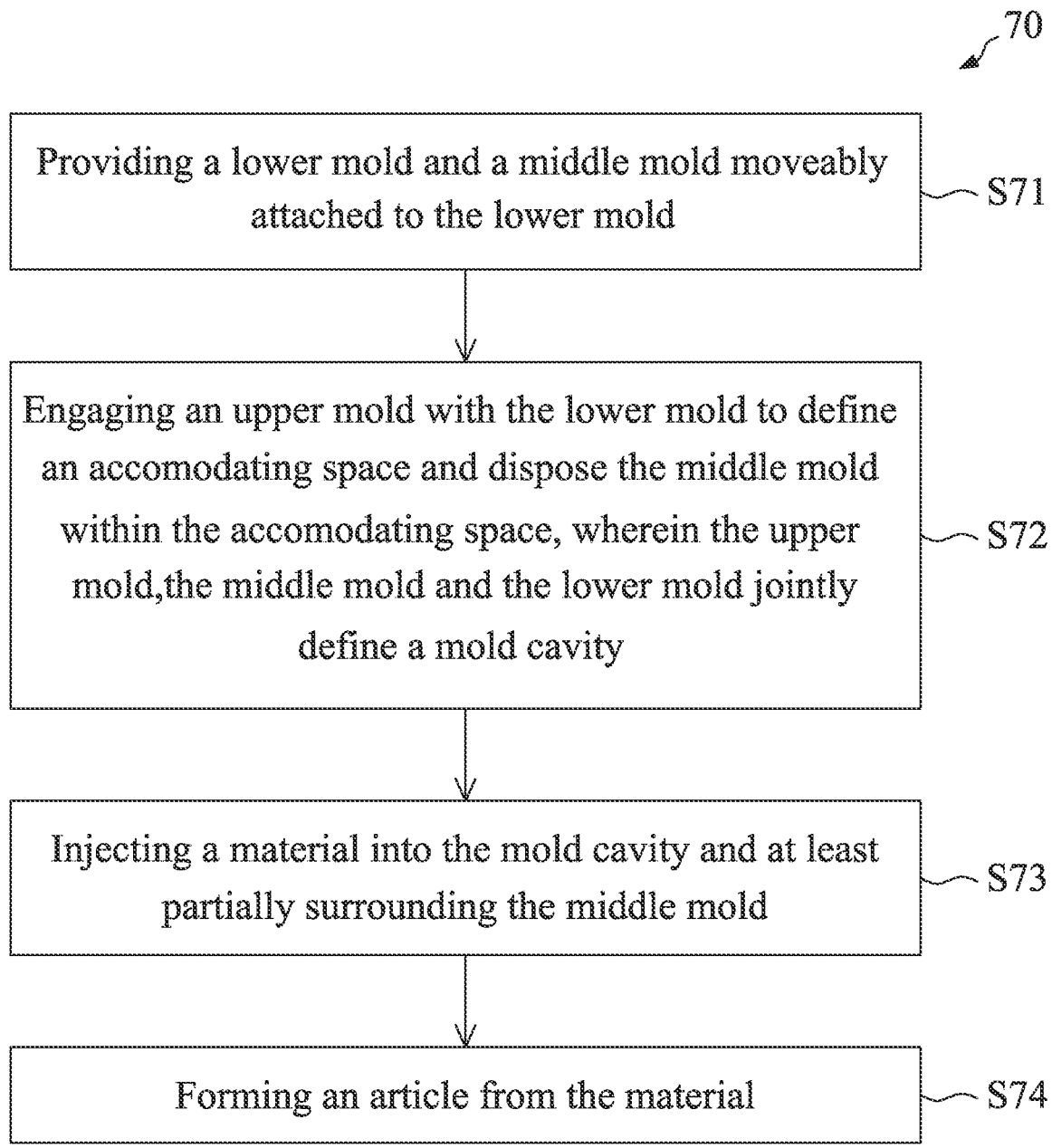
FIG. 21 is a flow chart illustrating a molding method according to some embodiments of the present invention.

FIG. 21 is a flow chart illustrating a molding method according to some embodiments of the present invention. As shown in FIG. 21, the molding method 70 may include the following steps.

In some embodiments, the method 70 may include a step S71: providing a lower mold and a middle mold moveably attached to the lower mold. For example, as shown in FIG. 1A and FIG. 1B, a molding device 1 is provided. The molding device 1 may include an upper mold 2, a lower mold 3, a middle mold 4 and a position control mechanism 5. The middle mold 4 may be moveably attached to the lower mold 3 though the position control mechanism 5.

In some embodiments, the method 70 may include a step S72: engaging an upper mold with the lower mold to define an accommodating space and dispose the middle mold within the accommodating space, wherein the upper mold, the middle mold and the lower mold jointly define a mold cavity. For example, as shown in FIG. 3A and FIG. 3B, the upper mold 2 is engaged with the lower mold 3 to define an accommodating space 12, and the middle mold 4 is disposed within the accommodating space 12. The upper mold 2, the middle mold 4 and the lower mold 3 jointly define a mold cavity 14.

In some embodiments, the method 70 may include a step S73: injecting a material into the mold cavity and at least partially surrounding the middle mold. For example, as shown in FIG. 4A and FIG. 4B, a material 60 is injected into the mold cavity 14, and the material 60 at least partially surrounds the middle mold 4.

In some embodiments, the method 70 may include a step S74: forming an article from the material. For example, as shown in FIG. 4A and FIG. 4B, an article 6 is formed from the material 60.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein, may be utilized according to the present invention. Accordingly, the appended claims are intended to include within their scope such processes, machines, manufacture, compositions of matter, means, methods and steps.

What is claimed is:

1. A molding device, comprising:
   an upper mold;
   a lower mold disposed below the upper mold; and
   a middle mold disposed between the upper mold and the lower mold, and being moveably attached to the lower mold through a position control mechanism, wherein the position control mechanism includes at least one ejector and an elastic mechanism for controlling a movement of the ejector, an upper end of the ejector is attached to a bottom surface of the middle mold, and a lower end of the ejector extends into a hole structure of the lower mold.

2. The molding device of claim 1, wherein the upper mold and the lower mold jointly define an accommodating space for accommodating the middle mold when the molding device is in a closed configuration, wherein a maximum length of the accommodating space is substantially equal to a maximum length of the middle mold.

3. The molding device of claim 1, wherein the upper mold, the middle mold and the lower mold jointly define a mold cavity when the molding device is in a closed configuration, the upper mold includes a passage extending through the upper mold and being in communication with the mold cavity.

4. The molding device of claim 1, wherein the ejector is fixed to the bottom surface of the middle mold, and the ejector and the middle mold move concurrently.

5. The molding device of claim 1, wherein the middle mold is driven by the ejector.

6. The molding device of claim 1, wherein the ejector and the middle mold form a monolithic structure.

7. The molding device of claim 1, wherein the hole structure of the lower mold includes a first hole and a second hole in communication with each other, the first hole has an opening on a top surface of the lower mold, the second hole is under the first hole, a size of the second hole is smaller than a size of the first hole, so as to form a step structure, wherein an upper end of the elastic mechanism is connected to the bottom surface of the middle mold, and a lower end of the elastic mechanism is connected to the step structure of the hole structure of the lower mold.

8. The molding device of claim 1, wherein a maximum thickness of the middle mold is substantially equal to a maximum depth of a recess portion of the upper mold.

9. The molding device of claim 1, wherein an entirety of the position control mechanism is disposed under the bottom surface of the middle mold.

10. The molding device of claim 1, wherein an entire bottom surface of the middle mold is substantially coplanar with a bottom surface of the upper mold when the molding device is in a closed configuration.

11. A molding method, comprising:
   (a) providing a lower mold and a middle mold moveably attached to the lower mold, wherein a gap between a top surface of the lower mold and a bottom surface the middle mold is generated by a position control mechanism, the position control mechanism includes at least one ejector and an elastic mechanism for controlling a movement of the ejector, an upper end of the ejector is attached to a bottom surface of the middle mold, and a lower end of the ejector extends into a hole structure of the lower mold;
   (b) engaging an upper mold with the lower mold to define an accommodating space and dispose the middle mold within the accommodating space, wherein the upper mold, the middle mold and the lower mold jointly define a mold cavity;
   (c) injecting a material into the mold cavity and at least partially surrounding the middle mold; and
   (d) forming an article from the material.

12. The method of claim 11, wherein in step (a), a gap between a top surface of the lower mold and a bottom surface the middle mold is generated by the position control mechanism.

13. The method of claim 11, further comprising:
   (e) disengaging the lower mold from the upper mold, wherein the middle mold is driven by the elector to move upward.

14. The method of claim 13, further comprising:
   (f) separating the upper mold from the middle mold.

15. The method of claim 11, wherein in (d), the article includes a base portion, at least one upper portion, at least one strip and an additional pin, the upper portion connects to the base portion, the strip connects to the upper portion, and the additional pin connects to the strip.

16. The method of claim 15, further comprising:
   (h) removing the additional pin and the strip.

17. The method of claim 11, wherein in step (a), the ejector is fixed to the bottom surface of the middle mold, and in step (b), the ejector and the middle mold move concurrently.

18. The method of claim 11, wherein in step (b), an elastic potential energy is stored in a pressed elastic mechanism in the lower mold.

19. The method of claim 11, wherein in step (b), an inner surface of the upper mold contacts a front surface and a back surface of the middle mold.

20. The method of claim 11, wherein in step (b), an entire bottom surface of the middle mold is substantially coplanar with a bottom surface of the upper mold when the molding device is in a closed configuration.

* * * * *